US009690997B2

(12) United States Patent
Murao et al.

(10) Patent No.: US 9,690,997 B2
(45) Date of Patent: *Jun. 27, 2017

(54) RECOGNITION OBJECT DETECTING APPARATUS

(71) Applicant: DENSO CORPORATION, Kariya, Aichi-pref. (JP)

(72) Inventors: Toshikazu Murao, Obu (JP); Takayuki Kimura, Southfield, MI (US); Kentarou Shiota, Nagoya (JP); Noriaki Shirai, Chiryu (JP); Naoki Sugiyama, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,136

(22) Filed: Jan. 9, 2015

(65) Prior Publication Data
US 2015/0117715 A1 Apr. 30, 2015

Related U.S. Application Data

(63) Continuation-in-part of application No. 13/486,366, filed on Jun. 1, 2012.

(30) Foreign Application Priority Data

Jun. 6, 2011 (JP) .................................. 2011-126474

(51) Int. Cl.
G06K 9/00 (2006.01)
G06K 9/38 (2006.01)
(52) U.S. Cl.
CPC .......... G06K 9/00825 (2013.01); G06K 9/38 (2013.01)

(58) Field of Classification Search
CPC ............................ G06K 9/00825; G06K 9/38
See application file for complete search history.

(56) References Cited

U.S. PATENT DOCUMENTS 5,796,430 A 8/1998 Katoh et al.
6,204,881 B1 3/2001 Ikeda et al.
(Continued)

FOREIGN PATENT DOCUMENTS

DE 102007034608 1/2009
EP 1400916 3/2004
(Continued)

OTHER PUBLICATIONS

Extended European Search Report dated Aug. 14, 2015, issued in the corresponding European application No. 14186537.8.
(Continued)

*Primary Examiner* — Siamak Harandi
(74) *Attorney, Agent, or Firm* — Harness, Dickey & Pierce, P.L.C.

(57) ABSTRACT

A recognition object detecting apparatus is provided which includes an imaging unit which generates image data representing a taken image, and a detection unit which detects a recognition object from the image represented by the image data. The imaging unit has a characteristic in which a relation between luminance and output pixel values varies depending on a luminance range. The detection unit binarizes the output pixel values of the image represented by the image data by using a plurality of threshold values to generate a plurality of binary images, and detects the recognition object based on the plurality of binary images.

24 Claims, 16 Drawing Sheets

(56) References Cited

U.S. PATENT DOCUMENTS

| | | |
|---|---|---|
| 6,611,610 B1 | 8/2003 | Stam et al. |
| 7,512,252 B2 | 3/2009 | Otsuka et al. |
| 7,865,280 B2 | 1/2011 | Fujinawa et al. |
| 9,139,140 B2 | 9/2015 | Karl |
| 2004/0027458 A1 | 2/2004 | Takada |
| 2004/0051790 A1 | 3/2004 | Tamaru et al. |
| 2004/0091133 A1 | 5/2004 | Monji |
| 2006/0087747 A1 | 4/2006 | Ohzawa et al. |
| 2006/0125919 A1 | 6/2006 | Camilleri et al. |
| 2007/0183657 A1 | 8/2007 | Kidono et al. |
| 2008/0030374 A1 | 2/2008 | Kumon et al. |
| 2008/0165264 A1 | 7/2008 | Saito et al. |
| 2008/0218597 A1 | 9/2008 | Cho |
| 2008/0219585 A1 | 9/2008 | Kasai et al. |
| 2008/0303919 A1 | 12/2008 | Egawa |
| 2009/0010494 A1 | 1/2009 | Bechtel et al. |
| 2010/0254595 A1 | 10/2010 | Miyamoto |
| 2010/0259628 A1 | 10/2010 | Rous |
| 2010/0265330 A1* | 10/2010 | Li ......................... B60Q 1/143 348/148 |
| 2011/0163904 A1 | 7/2011 | Alland et al. |
| 2011/0234805 A1 | 9/2011 | Matsuda et al. |
| 2011/0267467 A1 | 11/2011 | Kimura et al. |
| 2012/0001791 A1 | 1/2012 | Wintermantel |
| 2012/0033079 A1 | 2/2012 | Karl |
| 2012/0062746 A1 | 3/2012 | Otsuka et al. |
| 2014/0232900 A1 | 8/2014 | Wernersson |
| 2014/0347530 A1 | 11/2014 | Kanou et al. |
| 2015/0172618 A1 | 6/2015 | Takahashi et al. |

FOREIGN PATENT DOCUMENTS

| | | |
|---|---|---|
| EP | 1887492 | 2/2008 |
| EP | 2189340 A2 | 5/2010 |
| JP | S5979872 A | 5/1984 |
| JP | 05-176233 | 7/1993 |
| JP | 10-269352 | 10/1998 |
| JP | 2005-092857 | 4/2005 |
| JP | 2005-157670 | 6/2005 |
| JP | 4034565 | 11/2007 |
| JP | 2008-040615 | 2/2008 |
| JP | 2009-061812 | 3/2009 |
| JP | 2010-020483 | 1/2010 |
| JP | 2010-102572 | 5/2010 |
| JP | 2010-141583 * | 6/2010 |
| JP | 2011-233763 | 11/2011 |
| JP | 2012-073927 | 4/2012 |
| JP | 2012-088785 | 5/2012 |
| JP | 2012-146142 | 8/2012 |
| WO | WO-2013088821 A1 | 6/2013 |

OTHER PUBLICATIONS

Office Action dated Apr. 23, 2013 in corresponding Japanese Application No. 2011-126474 with English translation.

Office Action dated Dec. 1, 2016 issued in U.S. Appl. No. 14/919,758.

Office Action dated Apr. 11, 2016 issued in U.S. Appl. No. 14/497,450.

* cited by examiner

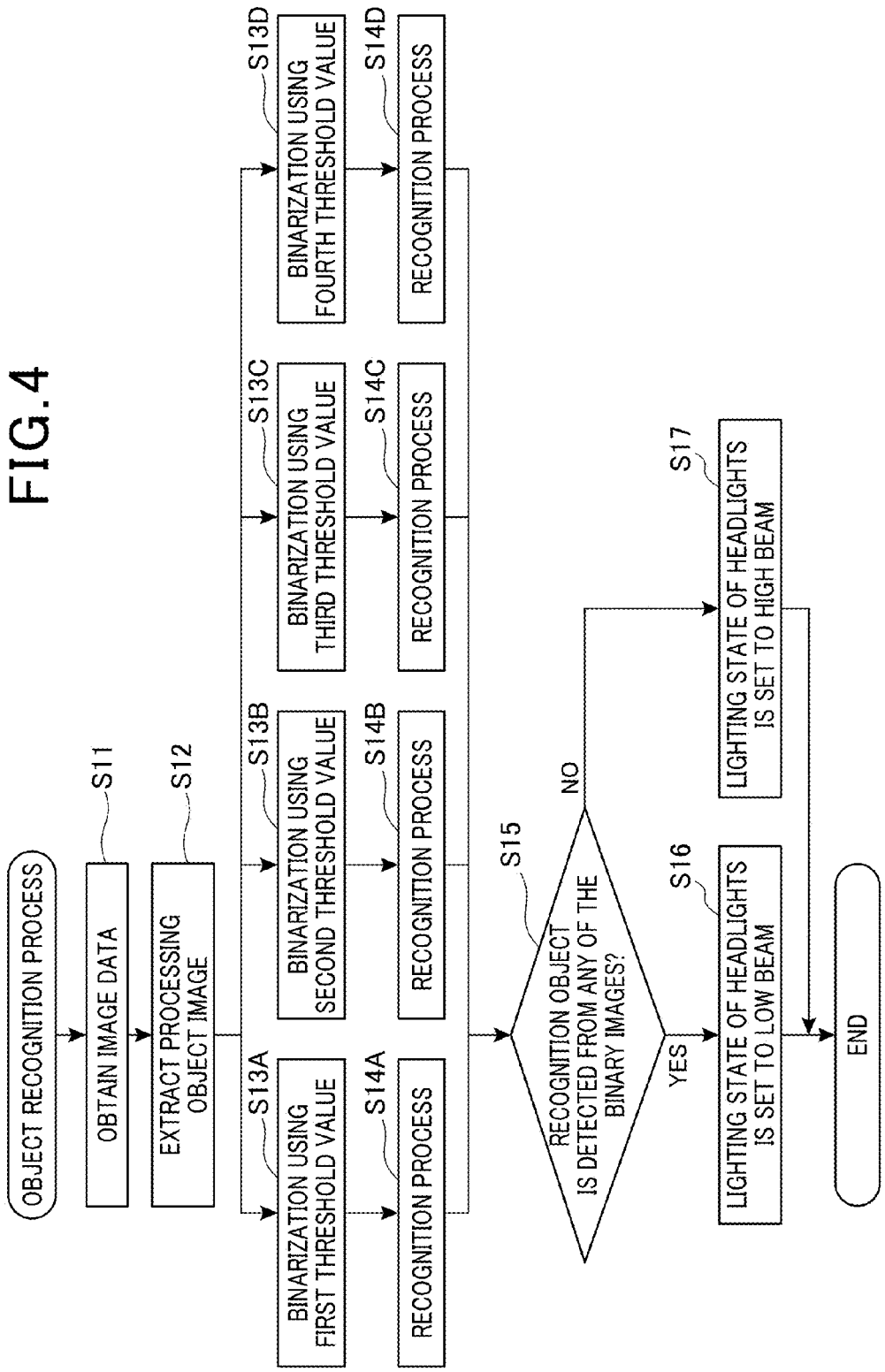

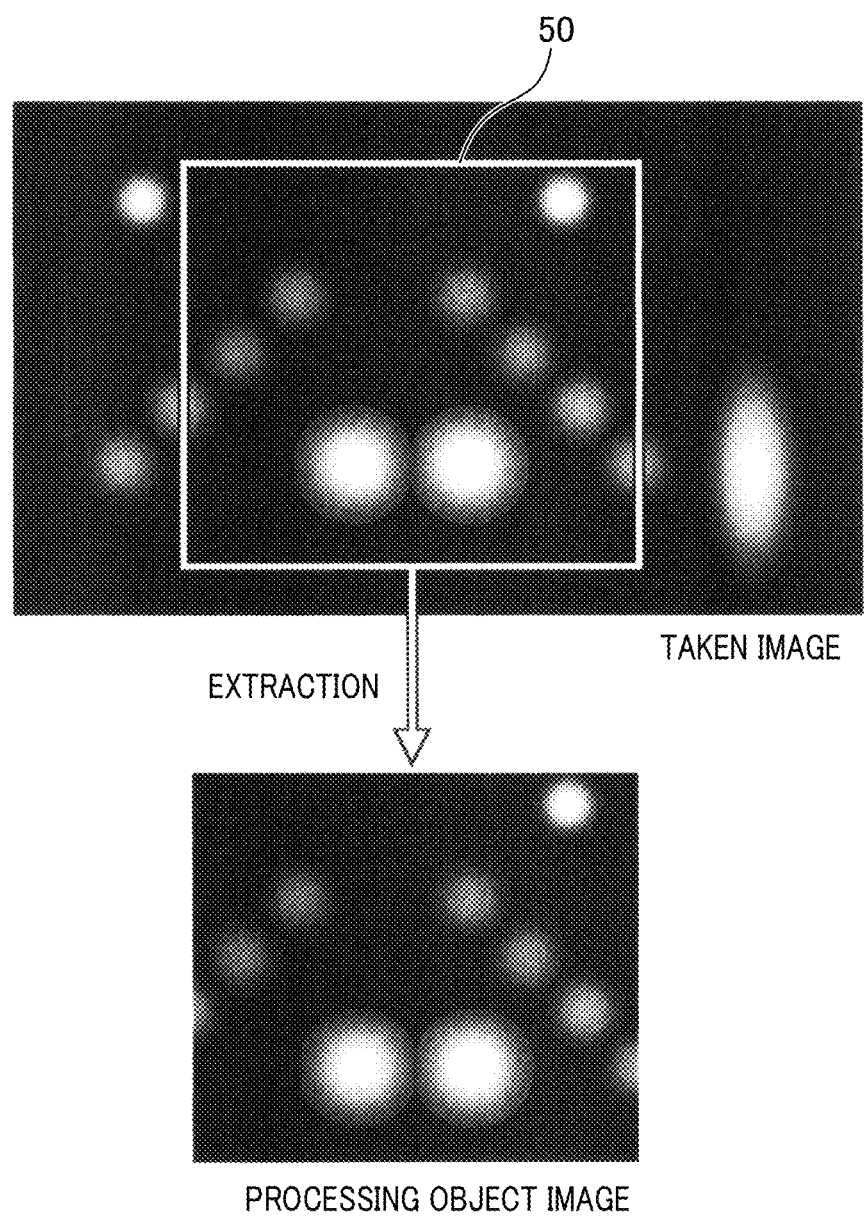

FIG.7
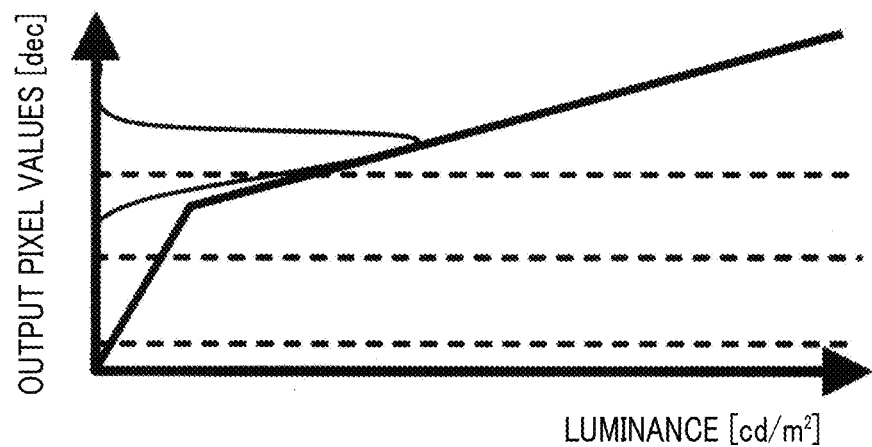
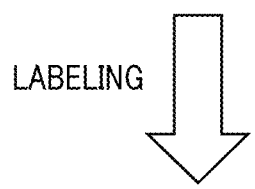
LABELING
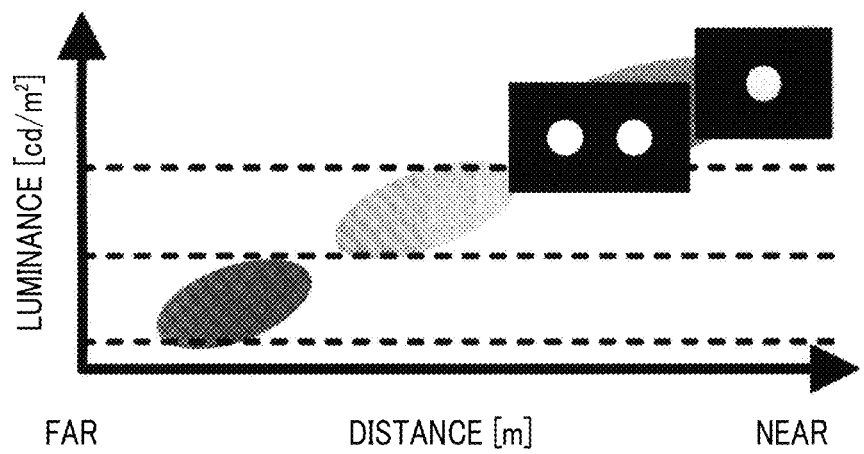

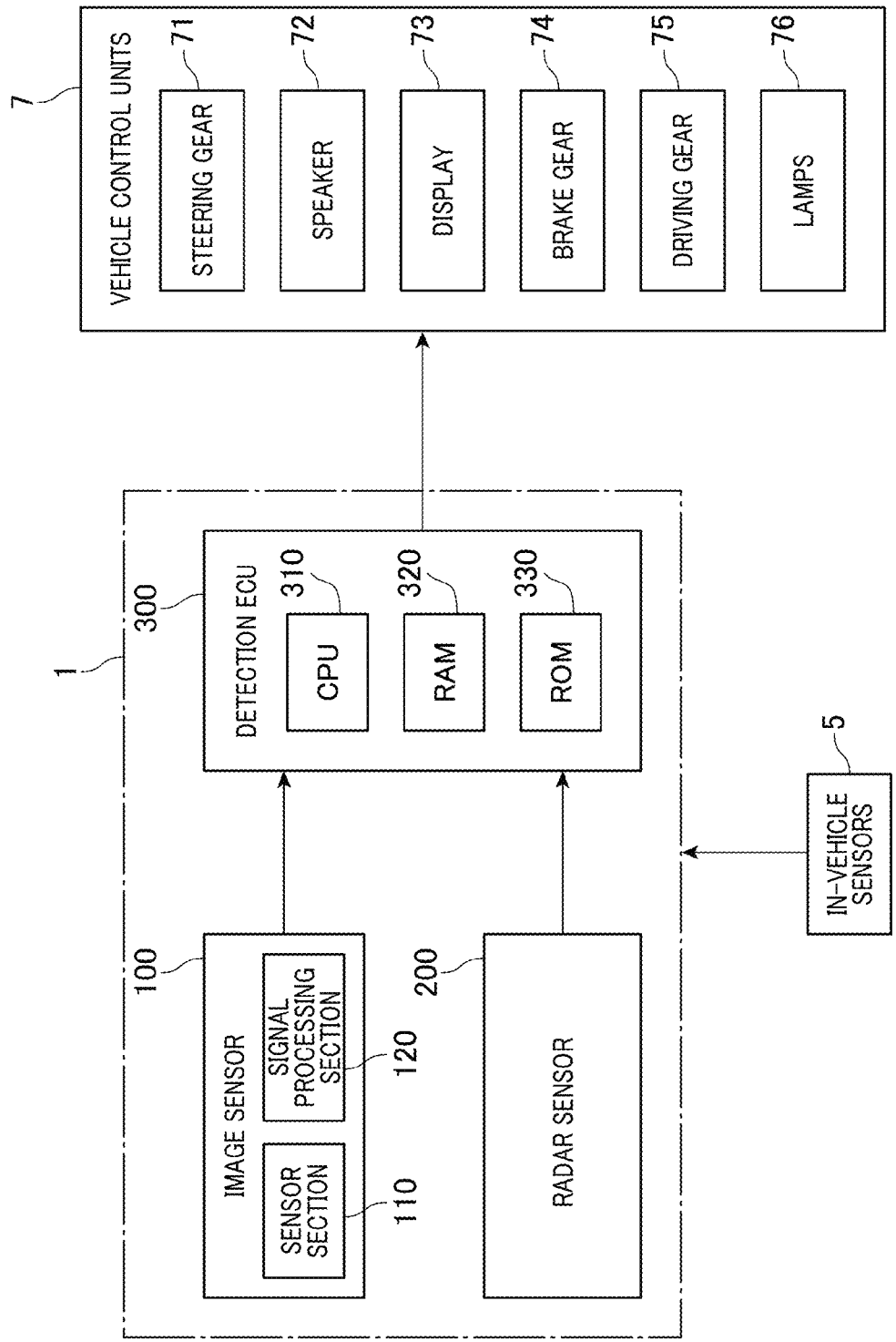

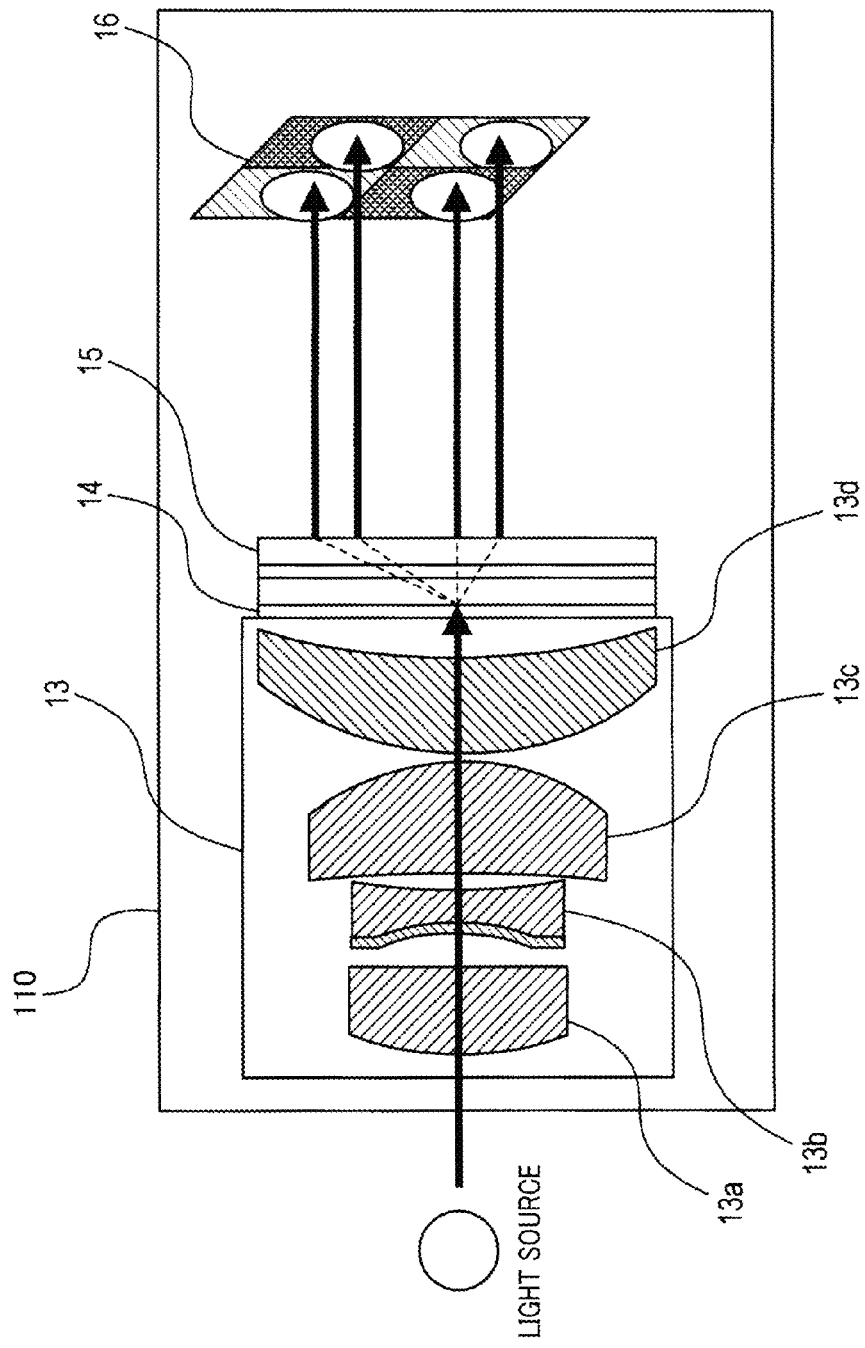

RECOGNITION OBJECT DETECTING APPARATUS

CROSS-REFERENCE TO RELATED APPLICATION

This application is a continuation-in-part of U.S. Ser. No. 13/486,366 field Jun. 1, 2012 and claims priority from earlier Japanese Patent Application No. 2011-126474 filed Jun. 6, 2011, the description of which is incorporated herein by reference.

BACKGROUND

Technical Field

The present invention relates to a recognition object detecting apparatus which detects a recognition object from an image taken by an in-vehicle camera.

Related Art

Conventionally, a technique is known which detects a predetermined recognition object from an image taken by an in-vehicle camera. For example, JP-A-2009-61812 discloses a technique in which an image of a scene ahead of a vehicle traveling at night is taken by using an in-vehicle camera. Next, tail lights of a leading vehicle or headlights of an oncoming vehicle are detected from the taken image as a recognition object. By using this technique, the control is realized under which headlights of an own vehicle are set to low beam if a leading vehicle or an oncoming vehicle is detected, and the headlights are set to high beam if a leading vehicle or an oncoming vehicle is not detected (auto high beam control).

Note that when a leading vehicle or an oncoming vehicle is positioned at a long distance from the own vehicle, luminance of the tail lights or the headlights in the image taken by the in-vehicle camera becomes lower and the image of the tail lights or the headlights easily disappears due to noise and the like, compared with a case where the leading vehicle or the oncoming vehicle is positioned at a short distance from the own vehicle. As a method for increasing accuracy in detecting tail lights or headlights at a long distance (low luminance), increasing the imaging sensitivity of the in-vehicle camera can be considered. However, as the sensitivity increases, the image of the tail lights or the headlights existing at a short distance (high luminance) is easily saturated in the image taken by the in-vehicle camera.

To solve the above problem, Japanese Patent No. 4034565 discloses a technique in which an image is first taken at low sensitivity, and another image is next taken at high sensitivity if tail lights of a leading vehicle or headlights of an oncoming vehicle are not detected from the taken image. That is, by performing imaging two times, accuracy increases in detecting the recognition object at both low sensitivity and high sensitivity. According to this technique, the lights of vehicles at a long distance can be detected despite the presence of noise and the like, while the lights of vehicles at a short distance away can avoid being saturated in captured images.

However, when performing imaging multiple times with changing imaging sensitivity as the conventional technique described above, the processing load substantially increases. The increased processing load causes a problem that the cost of manufacturing the apparatus increases and a problem that the miniaturization of the apparatus is prevented as the amount of heat generation increases. Note that such problems can be caused not only in the technique in which tail lights of a leading vehicle or headlights of an oncoming vehicle are detected as a recognition object but in a technique in which other recognition objects are detected.

SUMMARY

An embodiment provides a recognition object detecting apparatus which increases accuracy in detecting a recognition object while suppressing processing load.

As an aspect of the embodiment, a recognition object detecting apparatus is provided which includes: an imaging unit which generates image data representing a taken image; and a detection unit which detects a recognition object from the image represented by the image data. The imaging unit has a characteristic in which a relation between luminance and output pixel values varies depending on a luminance range. The detection unit binarizes the output pixel values of the image represented by the image data by using a plurality of threshold values to generate a plurality of binary images, and detects the recognition object based on the plurality of binary images.

BRIEF DESCRIPTION OF THE DRAWINGS

In the accompanying drawings:

FIG. 4 is a flowchart of an object recognition process;

FIG. 5 is a diagram showing a process for extracting an image in a detection area of a taken image as a processing object image;

FIG. 7 is a diagram showing a process for estimating a distance between an own vehicle and a light source based on the luminance of the light source;

FIG. 10 is a block diagram illustrating a general configuration of a vehicle control system;

FIG. 11 is a schematic diagram illustrating a sensor section;

DETAILED DESCRIPTION OF THE PREFERRED EMBODIMENTS

With reference to the accompanying drawings, hereinafter are described embodiments of the present invention.

[First Embodiment]

(1. General Configuration)

Figure 1:
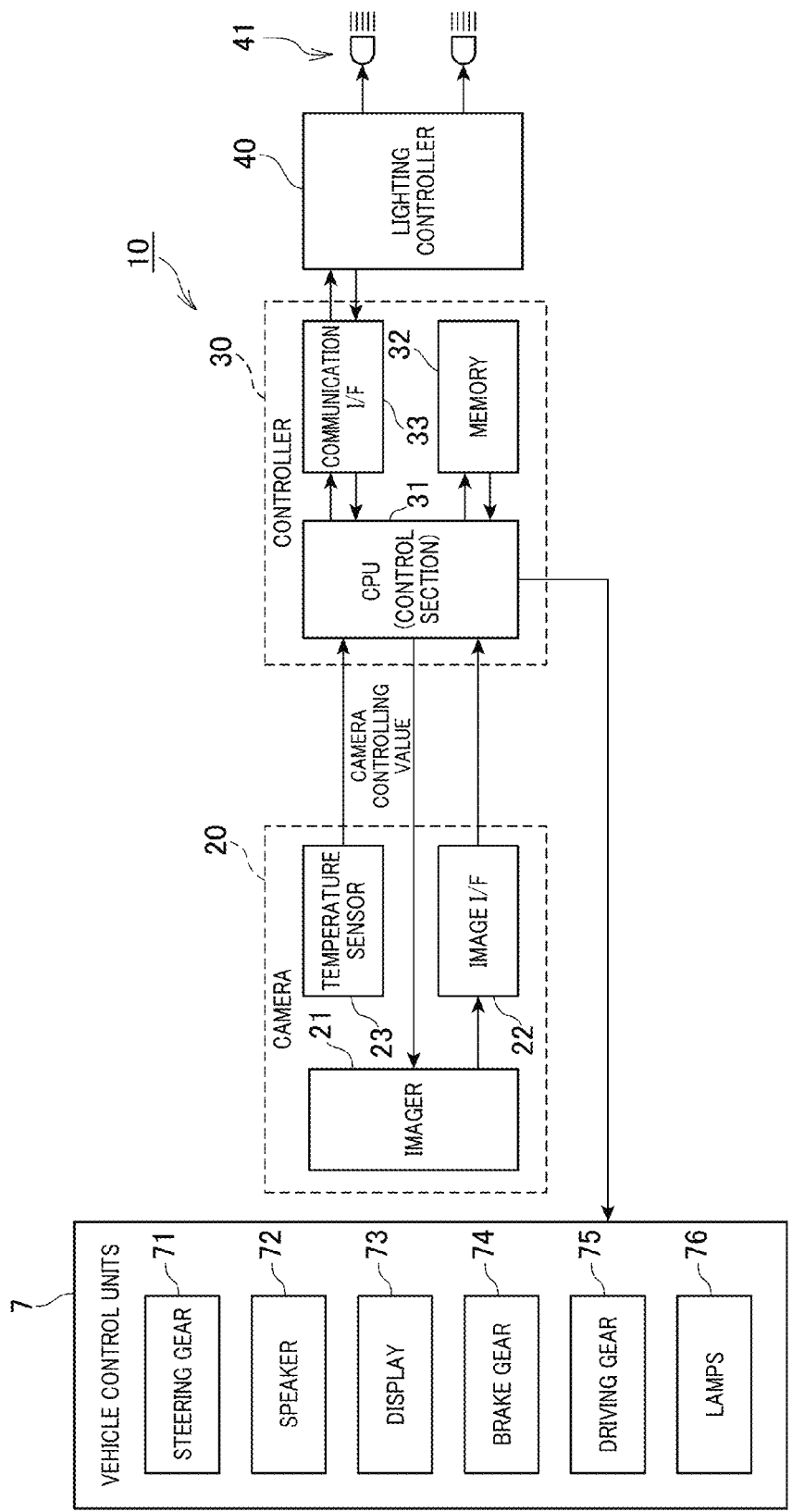
FIG. 1 is a block diagram showing a configuration of a vehicle control system of an embodiment.

FIG. 1 is a block diagram showing a configuration of a vehicle control system 10 of the embodiment.

The vehicle control system 10 is installed in a predetermined vehicle. The vehicle control system 10 performs auto high beam control under which the lighting state of headlights 41 of the own vehicle is changed, depending on whether or not another vehicle (leading vehicle or oncoming vehicle) is travelling ahead of the predetermined vehicle (own vehicle). While performing the auto high beam control, the lighting state of headlights 41 is automatically set to low beam if a leading vehicle or an oncoming vehicle is present and to high beam if neither a leading vehicle nor an oncoming vehicle is present.

To realize the auto high beam control described above, the headlight control system 10 includes an in-vehicle camera 20 (hereinafter, simply referred to as "camera") which takes an image of a scene ahead of the own vehicle, a controller 30 which detects tail lights of a leading vehicle and headlights of an oncoming vehicle as recognition objects from an image taken by the camera 20, and a lighting controller 40 which changes the lighting state of the headlights 41.

The camera 20 outputs image data representing an image of a scene ahead of the own vehicle. The camera 20 is placed at a predetermined position of the own vehicle (e.g. the back side of an inner rear-view mirror). Specifically, the camera 20 includes an imager 21 which generates image data representing a taken image, an image interface 22 which outputs the image data generated by the imager 21 to the controller 30, and a temperature sensor 23 which measures the temperature of the imager 21.

The imager 21 includes an amplifier and an A/D converter in addition to a known CCD image sensor or a CMOS image sensor. When the image sensor takes an image, the amplifier and the A/D converter amplifies an analog signal representing luminance (brightness) of each pixel of the image with a predetermined gain, and then converts the amplified analog values to digital values. The imager 21 outputs a signal of the converted digital values (output pixel values of the pixels) as image data by each line of the image.

Figure 2A:
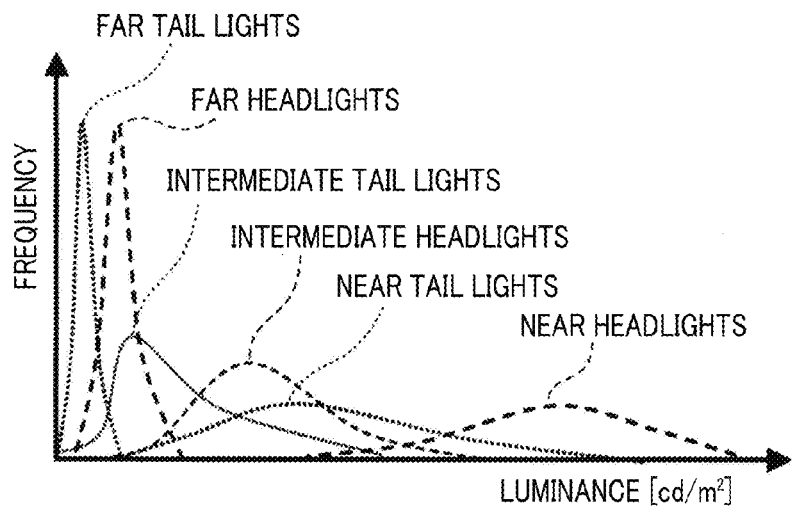
FIG. 2A is a diagram showing a luminance distribution.
Figure 2B:
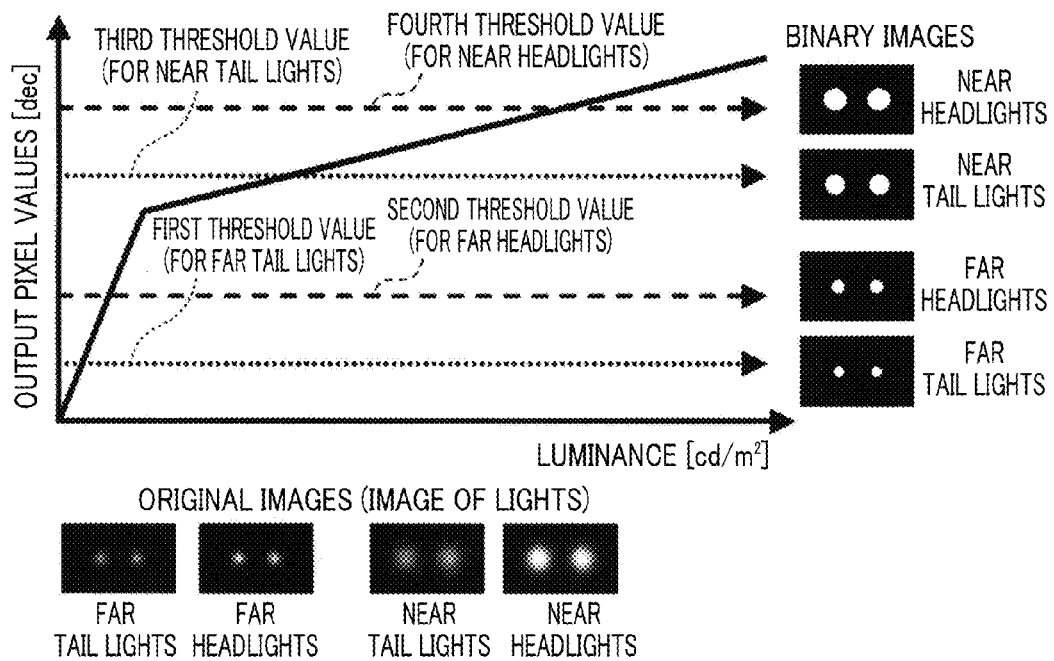
FIG. 2B is a diagram showing a characteristic of an imager (the relation between luminance and output pixel values)
Figure 3:
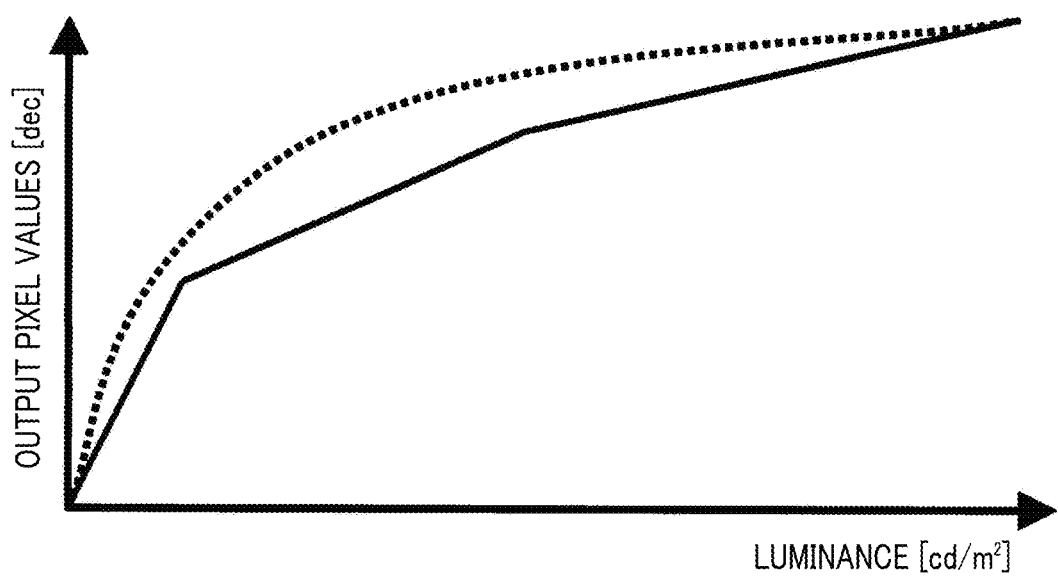
FIG. 3 is a diagram showing another characteristic of an imager.

To be specific, as the imager 21 of the present embodiment, a unit is used which can set high dynamic range (HDR) which expands dynamic range. FIG. 2B shows a characteristic of the imager 21 (the relation between luminance and output pixel values). According to the characteristic, the relation between luminance and output pixel values is not constant (linear) over the whole luminance range and varies depending on the luminance range (high dynamic range characteristic). Specifically, the characteristic of the imager 21 shows a line graph which has different inclinations between a low luminance range and the remaining range (high luminance range) (that is, lines having two inclinations are combined). Hence, the imager 21 can perform output over a wide luminance range while making resolution in the low luminance range high. Note that, the relation between luminance and output pixel values shown in FIG. 2B is one example. For example, the characteristic of the imager 21 may show a line having combined three or more inclinations as indicated by a solid line in FIG. 3, or a log characteristic (curve) as indicated by a dotted line in FIG. 3.

The controller 30 performs a process detecting tail lights of a leading vehicle and headlights of an oncoming vehicle as recognition objects from an image taken by the camera 20 (image represented by image data generated by the imager 21), and outputs the result of the process to the lighting controller 40. Specifically, the controller 30 includes a CPU 31, a memory 32 for storing data and a communication interface 33 for communicating with the lighting controller 40.

The CPU 31 stores image data received from the camera 20 in the memory 32 and performs a process detecting a recognition object from an image represented by the image data. The CPU 31 outputs the result of the process (information indicating whether or not a recognition object exists) to the lighting controller 40 via the communication interface 33.

The CPU 31 is connected to vehicle control units 7. The vehicle control units 7 include a plurality of units that control controlled objects of a body system, a powertrain system and a chassis system of the vehicle. The controlled objects at least include a steering gear (e.g., electric power steering) 71, speaker 72, display 73, brake gear (e.g., brake) 74, driving gear (e.g., accelerator) 75 and lamps 76. The vehicle control units 7 control the behaviors of the controlled object in accordance with the running conditions of the vehicle.

In addition, the CPU 31 detects, based on the image represented by the image data, at least one of the following objects. The objects include an obstacle, a preceding vehicle, a preceding pedestrian, a preceding object, a stationary vehicle, a stationary pedestrian, a stationary object, an on-coming vehicle, an on-coming pedestrian, an on-coming object, a lane, a road surface condition, a road shape, a light source, a road sign, a traffic signal, an entity which cuts off a field of view of a light-receiving section, and an environmental feature outside a vehicle.

The vehicle control units 7 controls the behaviors of the controlled objects according to the instructions from the CPU 31 to perform known vehicle controls, such as collision avoidance, speed warning, lane departure prevention, rear-end collision warning, inter-vehicle warning, lane departure warning, auto high beam, sign indication, full speed range adaptive cruise control (ACC), lane keeping, lane change accident prevention, blind spot warning, blind spot monitoring, automatic lane change, forward cross traffic warning, rearward cross traffic warning, erroneous pedal usage prevention, and automatic parking.

That is, the CPU 31 performs, according to the detected object, vehicle control regarding at least one of collision avoidance, speed warning, lane departure prevention, rear-end collision warning, inter-vehicle warning, lane departure warning, auto high beam, sign indication, full speed range adaptive cruise control (ACC), lane keeping, lane change accident prevention, blind spot warning, blind spot monitoring, automatic lane change, forward cross traffic warning, rearward cross traffic warning, erroneous pedal usage prevention, and automatic parking.

In addition, to suppress the variation in image data (output pixel values) due to the variation in the temperature of the imager 21 influenced by environmental temperature or the like, the CPU 31 outputs a camera controlling value to the camera 20 (specifically, imager 21) depending on the temperature of the imager 21 measured by the temperature sensor 23, thereby controlling exposure of the camera 20 (correcting the relation between luminance and output pixel values). As the camera controlling value, for example, exposure time (shutter speed), a frame rate, an indication value for adjusting the gain of the amplifier and the like are outputted. Note that, in the present embodiment, the exposure control is not performed except the control depending on the temperature of the imager 21 (the relation between luminance and output pixel values is fixed).

The lighting controller 40 controls the headlights 41. The lighting controller 40 changes the lighting state (high beam/low beam) of the headlights 41 depending on the information received from the controller 30.

(2.Processes)

Next, processes performed by the CPU 31 according to a previously stored program are explained.

First, an object recognition process periodically (e.g. at intervals of 100 ms) performed by the CPU 31 is explained with reference to a flowchart shown in FIG. 4.

When starting the object recognition process shown in FIG. 4, the CPU 31 first obtains image data representing an image of a scene ahead of the own vehicle from the camera 20 (S11). Next, as shown in FIG. 5, the CPU 31 extracts an image in a detection area 50 from a taken image represented by the image data, as a processing object image (S12). The detection area 50 is set considering regulation requirements, object recognition capability, processing load and the like.

Next, the CPU 31 performs binarization for the processing object image (one processing object image) using four threshold values to generate four binary images (S13A, S13B, S13C, and S13D). The four threshold values include a first threshold value for far tail lights, a second threshold value for far headlights, a third threshold value for near tail lights, and a fourth threshold value for near headlights.

Hereinafter, the reason why the four threshold values are used is explained. Since tail lights of a leading vehicle and headlights of an oncoming vehicle have luminance higher than that of the periphery of the vehicle, part of a taken image having output pixel values higher than a threshold value can be detected as the tail lights or the headlights. Note that since a taken image can include an object having high luminance (e.g. street lamps, signs reflecting light or the like) as clutter in addition to the tail lights and the headlights, the tail lights and the headlights are determined by analyzing the shape of the part having output pixel values higher than the threshold value. To detect the shape of a recognition object accurately, a threshold value suitable for the luminance of the recognition object is required to be used. However, the luminance of the tail lights or the headlights is detected that it is lower as the distance between the tail lights or the headlights and the own vehicle becomes longer. Hence, if detecting tail lights and headlights at a long distance by using one threshold value, the shapes of the tail lights and the headlights at a short distance are not detected accurately. In addition, since tail lights have luminance lower than that of headlights, the tail lights and the headlights are preferably distinguished from each other to increase detection accuracy. Hence, in the present embodiment, four threshold values (first to fourth threshold values) are used which include a threshold value for far tail lights, a threshold value for far headlights, a threshold value for near tail lights, and a threshold value for near headlights.

These four threshold values are set in the design stage. Hereinafter, a method for setting threshold values is explained.

First, as an examination for obtaining a reference value of luminance of a recognition object, the luminance of the recognition object is measured depending on the distance from the own vehicle. Specifically, while traveling through an ordinary road or a test road corresponding to an actual traveling environment, an image of a recognition object (tail lights of a leading vehicle or headlights of an oncoming vehicle) and clutter (a street lamp, a sign or the like) is taken. Based on the taken image, a luminance distribution (distribution showing the relation between luminance and frequency (the number of pixels)) is generated as shown in FIG. 2A. Based on the generated luminance distribution, luminance ranges and frequency of the tail lights (far tail lights) of the leading vehicle at a long distance (first distance) from the own vehicle and the headlights (far headlights) of the oncoming vehicle at a long distance (first distance) from the own vehicle and luminance ranges and frequency of the tail lights (near tail lights) of the leading vehicle at a short distance (second distance shorter than the first distance) from the own vehicle and the headlights (near headlights) of the oncoming vehicle at a short distance (second distance shorter than the first distance) from the own vehicle are specified. Note that, in the luminance distribution shown in FIG. 2A, luminance ranges and frequency of the tail lights (intermediate tail lights) of the leading vehicle at an intermediate distance (third distance shorter than the first distance and longer than the second distance) from the own vehicle and the headlights (intermediate headlights) of the oncoming vehicle at an intermediate distance (third distance shorter than the first distance and longer than the second distance) from the own vehicle are specified.

Next, based on the luminance range and the frequency of the recognition object, the luminance range and the resolution for imaging are determined to perform an accurate recognition process. That is, an exposure amount of HDR is determined for each recognition object. According to the luminance distribution shown in FIG. 2A, as the distance from the own vehicle becomes longer, the luminance detected from the light source tends to become lower, while the luminance range tends to become smaller. Hence, the resolution in the low luminance range is set to be higher than that in the high luminance range. That is, the resolution is set so that the width of the output pixel values in the low luminance range with respect to the unit luminance width becomes larger than the width of the output pixel values in the high luminance range with respect to the unit luminance width. In the present embodiment, as shown in FIG. 2B, the relation between luminance and output pixel values is set to the relation between straight lines having different inclinations in a low luminance range and a high luminance range. The boundary position (division point) between the low luminance range and the high luminance range is determined based on the luminance distribution. In addition, threshold values for detecting each recognition object (first to fourth threshold values) are set in the vicinity of the lower limit of the distribution in which the luminance distribution of each recognition object is converted to the output pixel values (so that the output pixel values of each recognition object are larger than the threshold values and the output pixel values of clutter having luminance lower than that of the recognition object are not larger than the threshold values) (refer to FIG. 7B).

The CPU 31 performs binarization for the processing object image using four threshold values (first to fourth threshold values) set as described above (S13A, S13B, S13C, S13D). The CPU 31 performs the recognition processes for detecting recognition objects (S14A, S14B, S14C, S14D) based on four binary images generated by each binarization process. Specifically, regarding the binary images, the shape (arrangement) of a group of pixels having output pixel values larger than a threshold value is compared with a predetermined reference shape (which has features of headlights and tail lights). If the shape of the group of pixels is not similar to the reference shape, the group of pixels is determined not to represent headlights or tail lights (but to represent clutter). In the case of headlights or tail lights, since two light sources are arranged in the horizontal direction with an interval therebetween, such shape is set as a reference shape. In addition, even in the case of headlights or tail lights, since the shape thereof is not accurately detected from a binary image obtained by binarization using an improper threshold value, the shape is not similar to the reference shape. In the case of a binary image obtained by binarization using a proper threshold value, the shape is similar to the reference shape. Hence, the distance between the recognition object and the own vehicle (long distance or short distance) and the type of light (headlights or tail lights) can also be assumed.

Figure 6A:
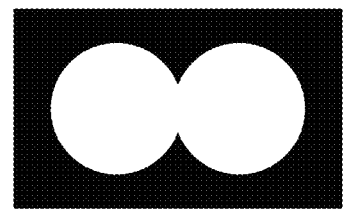
FIG. 6A is a diagram showing a binary image having a shape in which two light sources are connected to each other.
Figure 6B:
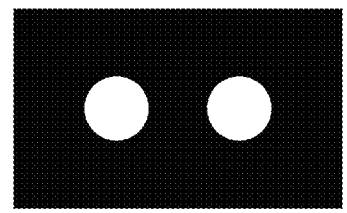
FIG. 6B is a diagram showing a binary image in which two light sources are placed with a distance in the horizontal direction therebetween.
Figure 6C:
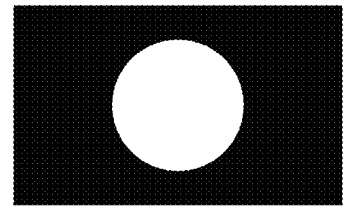
FIG. 6C is a diagram showing a binary image having one light source.

For example, when a processing object image of near headlights (recognition object having high luminance) is binarized using the first threshold value for far tail lights (the lowest threshold value), not only pixels of part of a light source but also pixels around the light source exceed the threshold value. As a result, as shown in FIG. 6A, since a binary image in which two light sources are connected to each other is obtained, the processing object image is determined not to represent headlights or tail lights. Meanwhile, when the same processing object image is binarized using the fourth threshold value for near tail lights (the highest threshold value), since a binary image in which two light sources are arranged in the horizontal direction with an interval therebetween is obtained as shown in FIG. 6B, the processing object image is determined to represent headlights or tail lights. Meanwhile, if clutter such as a street lamp is generated from one light source as shown in FIG. 6C, it can be distinguished from headlights or tail lights.

Note that the distance between the two light sources and the size of the light sources vary depending on the distance from the own vehicle. Hence, it is preferable to estimate the distance from the own vehicle and use a reference shape depending on the distance (FIG. 2B). As the distance from the own vehicle becomes longer, luminance detected from a light source becomes lower, which can be used to estimate the distance based on the output pixel values. That is, as shown FIG. 7A, the relation between luminance and output pixel values is previously obtained. As shown in FIG. 7B, there is the correlation between distances and luminance. Hence, the distance from the own vehicle can be estimated based on the distribution of output pixel values of the light source. In addition, it can be assumed based on the position of the recognition object in the processing object image that the distance is shorter as the recognition object positions lower.

Next, the CPU 31 determines whether or not the recognition object is detected from any of the binary images based on the result of the recognition process performed based on the binary images (S15). If it is determined that the recognition object is detected from any of the binary images (S15: YES), the lighting state of the headlights 41 of the own vehicle is set to low beam (S16). If it is determined that the recognition object is not detected from any of the binary images (S15: NO), the lighting state of the headlights 41 of the own vehicle is set to high beam (S17). Thereafter, the object recognition process shown in FIG. 4 is completed.

Figure 8:
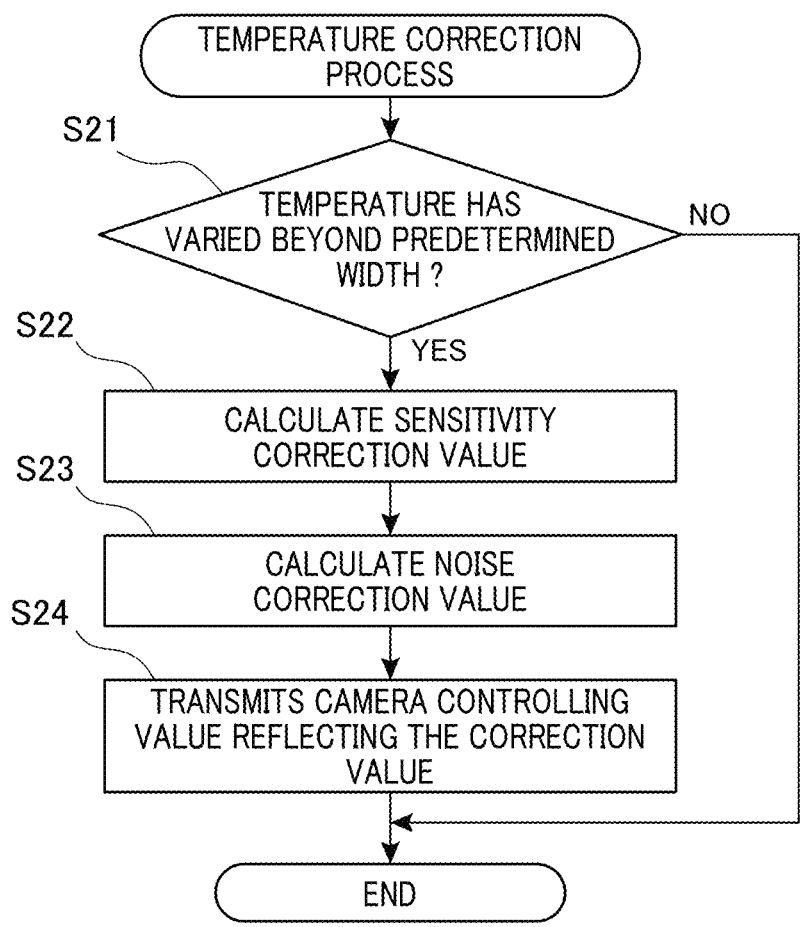
FIG. 8 is a flowchart of a temperature correction process.

Next, a temperature correction process is explained which is periodically (e.g. at intervals of 100 ms) performed by the CPU 31 with reference to a flowchart shown in FIG. 8.

First, the CPU 31 determines whether the temperature of the imager 21 measured by the temperature sensor 23 has varied beyond a predetermined width (S21). If it is determined that the temperature has not varied beyond the predetermined width (S21: NO), the CPU 31 completes the temperature correction process shown in FIG. 8.

Figure 9A:
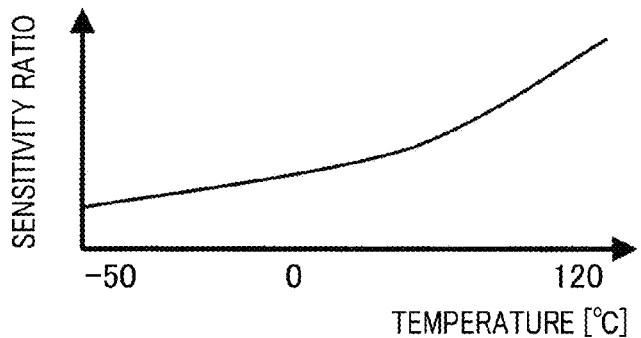
FIG. 9A is a diagram showing a temperature-sensitivity map.
Figure 9B:
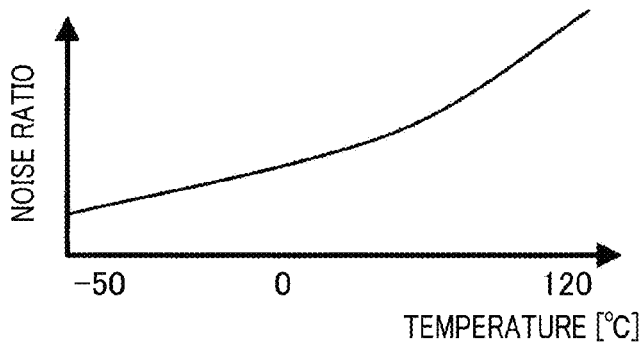
FIG. 9B is a diagram showing a temperature-noise map.

If it is determined that the temperature has varied beyond the predetermined width (S21: YES), the CPU 31 refers to a temperature-sensitivity map (which defines the relation between temperature and sensitivity correction values) shown in FIG. 9A and calculates a sensitivity correction value corresponding to the measured temperature (S22). In addition, the CPU 31 refers to a temperature-noise map (which defines the relation between temperature and noise correction values) shown in FIG. 9B and calculates a noise correction value depending on the measured temperature (S23). Then, the CPU 31 multiplies the sensitivity correction value by the noise correction value to calculate a correction value, and transmits a camera controlling value reflecting the calculated correction value to the camera 20 (S24).

Figure 9C:
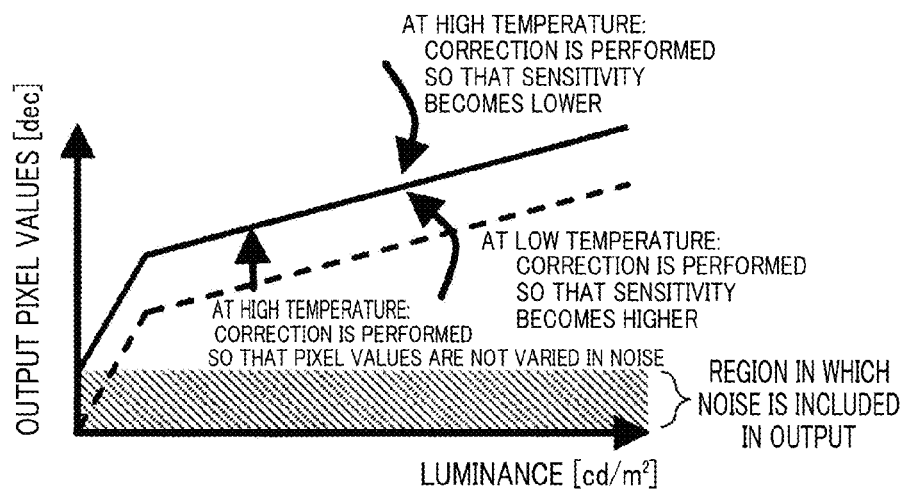
FIG. 9C is a diagram showing a method of correcting the relation between luminance and output pixel values.

When the camera controlling value is transmitted to the camera 20, the camera 20 corrects the relation between luminance and output pixel values. Specifically, as shown in FIG. 9C, as the temperature of the imager 21 becomes higher, the correction is performed so that the sensitivity becomes lower. As the temperature of the imager 21 becomes lower, the correction is performed so that the sensitivity becomes higher. In addition, since the lower output pixel values are easily buried in noise as the temperature of the imager 21 is higher, the correction is performed so that the output pixel values are corrected to be higher as the temperature is higher. As a result, variation of image data (output pixel values) depending on the temperature change of the imager 21 is suppressed. That is, depending on the temperature of the imager 21 measured by the temperature sensor 23, the imaging condition of the imager 21 (the relation between luminance and output pixel values) is corrected.

(3. Advantages)

As described above, according to the headlight control system 10 of the present embodiment, an image taken by the imager 21 having a high dynamic range characteristic is analyzed using four threshold values to detect a recognition object. Hence, multiple times of imaging with changing imaging sensitivity is not required. Hence, accuracy in detecting a recognition object can be increased while suppressing processing load and memory consumption.

In addition, since the imaging condition (the relation between luminance and output pixel values) is corrected depending on the temperature of the imager 21, the variation in the output pixel values can be suppressed even in the imager 21 whose output pixel values easily vary under the influence of the temperature.

In addition, the width of the output pixel values with respect to the unit luminance width in the low luminance range is set so as to be larger than the width of the output pixel values with respect to the unit luminance width in the high luminance range. Hence, the recognition object having low luminance is not easily buried in noise and the like, while the recognition object having high luminance is not easily saturated in images. Thereby, a wide luminance range can be targeted. Specifically, since the relation between luminance and output pixel values is represented by a plurality of straight lines, the relation between luminance and output pixel values can be easily represented.

In addition, four types of binary images are generated using four types of threshold values. The four types of threshold values include a first threshold value and a second threshold value which are set to respectively detect tail lights of a leading vehicle positioned at a long distance from the own vehicle and headlights of an oncoming vehicle positioned at a long distance from the own vehicle, and a third threshold value and a fourth threshold value which are set to respectively detect tail lights of a leading vehicle positioned at a short distance from the own vehicle and headlights of an oncoming vehicle positioned at a short distance from the own vehicle. The recognition objects are detected based on the respective generated four binary images. Hence, the tail lights of the leading vehicle and the headlights of the oncoming vehicle can be accurately detected. Specifically, the detected recognition objects can be classified into four types including far tail lights, far headlights, near tail lights, and near headlights. Therefore, the result of the process by the controller 30 can be used for more precise control.

In addition, since the recognition object is detected based on the shape of a group of pixels including a plurality of pixels having high luminance in the binary image, erroneous detection of clutter such as street lamps can be avoided.

Note that, in the present embodiment, the headlight control system 10 corresponds to a recognition object detecting apparatus. The imager 21 corresponds to an imaging means (imaging unit). The temperature sensor 23 corresponds to a measurement means (measurement unit). In addition, the object recognition process shown in FIG. 4 and performed by the CPU 31 corresponds to a process as a detection means (detection unit). The temperature correction process shown in FIG. 8 and performed by the CPU 31 corresponds to a process as an imaging condition correction means (imaging condition correction unit).

It will be appreciated that the present invention is not limited to the configurations described above, but any and all modifications, variations or equivalents, which may occur to those who are skilled in the art, should be considered to fall within the scope of the present invention.

(4.Other Embodiments)

For example, in the temperature correction process (FIG. 8) of the above embodiment, an imaging condition (the relation between luminance and output pixel values) is corrected depending on the temperature of the imager 21. However, the threshold values may be corrected instead of the imaging condition. Specifically, in S24 of FIG. 8, the first to fourth threshold values are subject to offset correction using a value obtained by multiplying the sensitivity correction value by the noise correction value, as a correction value. Hence, the influence of the variation of the output pixel values of the imager 21 due to the temperature can be reduced without correcting the imaging condition of the imager 21, the influence being applied to accuracy in detecting a recognition object. Note that, in this case, the temperature correction process shown in FIG. 8 and performed by the CPU 31 corresponds to a process as a threshold value correction means (threshold value correction unit).

In addition, in the above embodiment, the configuration is exemplified which detects tail lights of a leading vehicle or headlights of an oncoming vehicle as a recognition object. However, for example, a vehicle or a sign at night may be detected as a recognition object.

Hereinafter, aspects of the above-described embodiments will be summarized.

In the recognition object detecting apparatus of the embodiment, an imaging unit generates image data representing a taken image. A detection unit detects a recognition object from the image represented by the image data. Specifically, the imaging unit has a characteristic in which a relation between luminance and output pixel values varies depending on a luminance range. The detection unit binarizes the output pixel values of the image represented by the image data by using a plurality of threshold values to generate a plurality of binary images, and detects the recognition object based on the plurality of binary images.

That is, according to the recognition object detecting apparatus, an image taken by the imaging unit having a high dynamic range characteristic is analyzed using a plurality of threshold values to detect a recognition object. Hence, multiple times of imaging with changing imaging sensitivity is not required. Hence, accuracy in detecting a recognition object can be increased while suppressing processing load and memory consumption.

In addition to the above configuration, a measurement unit may measure a temperature of the imaging unit. An imaging condition correction unit may correct an imaging condition of the imaging unit depending on the temperature measured by the measurement unit. Hence, even in the case of the imaging unit whose output pixel values easily vary due to the temperature, the imaging condition can be corrected so as to suppress the variation.

Specifically, the imaging condition correction unit may correct the relation between luminance and output pixel values. Hence, by previously storing a characteristic indicating the variation of the relation between luminance and output pixel values depending on the temperature of the imaging unit, the variation in the output pixel values can be reduced.

In addition, instead of the imaging condition correction unit, a threshold value correction unit may correct the threshold value depending on the temperature measured by the measurement unit. Hence, without correcting the imaging condition of the imaging unit, the influence of the variation of the output pixel values of the imaging unit due to the temperature can be reduced, the influence being applied to accuracy in detecting a recognition object.

In the imaging unit, width of the output pixel values in a first luminance range with respect to unit luminance width may be larger than width of the output pixel values in a second luminance range with respect to the unit luminance width, the luminance of the second luminance range being larger than the luminance of the first luminance range. According to the configuration, a wide luminance range can be targeted while increasing accuracy in detecting a recognition object having low luminance.

In the imaging unit, the relation between luminance and output pixel values may be represented by a relation between a plurality of straight lines having different inclinations. According to the configuration, the relation between luminance and output pixel values can be easily represented.

The detection unit detects the recognition object based on a shape of a group of pixels including a plurality of pixels having high luminance in the binary image. According to the configuration, an object other than the recognition object is less likely to be erroneously detected as the recognition object.

The imaging unit may take an image of a scene ahead of an own vehicle, and the detection unit may detect tail lights of a leading vehicle or headlights of an oncoming vehicle as the recognition object. This configuration can be used for, for example, auto high beam control.

The detection unit may binarize the output pixel values of the image represented by the image data by using four threshold values including a first threshold value and a second threshold value which are set to respectively detect tail lights of a leading vehicle positioned at a long distance from the own vehicle and headlights of an oncoming vehicle positioned at a long distance from the own vehicle, and a third threshold value and a fourth threshold value which are set to respectively detect tail lights of a leading vehicle positioned at a short distance from the own vehicle and headlights of an oncoming vehicle positioned at a short distance from the own vehicle, to generate four of the binary images, and may detect the recognition object based on the four of the binary images. According to the configuration, the tail lights of the leading vehicle and the headlights of the oncoming vehicle can be accurately detected.

[Second Embodiment]

<General Configuration>

FIG. 10 is a block diagram illustrating a general configuration of a vehicle control system 1 according to a second embodiment. The vehicle control system 1 detects various objects that are present around the vehicle. Based on the detection results and various pieces of information acquired from in-vehicle sensors 5, the vehicle control system 1 performs various vehicle controls using vehicle control units 7.

The in-vehicle sensors 5 include sensors that detect the behaviors of the vehicle, and sensors that detect the environmental features surrounding the vehicle. The sensors that detect the behaviors of the vehicle include, for example, a vehicle speed sensor, various acceleration sensors and a steering-angle sensor. The sensors that detect the environmental features surrounding the vehicle include, for example, a unit for outputting position data of the own vehicle (e.g., GPS (global positioning system)), a unit serving as a source of supplying map data (e.g., navigation apparatus), a communication unit (e.g., mobile unit, such as a road-to-vehicle communication unit or a smartphone) and a radar. These sensors are used singly, or the detection results of the sensors are used in combination.

The vehicle control units 7 include a plurality of units that control controlled objects of a body system, a powertrain system and a chassis system of the vehicle. The controlled objects at least include a steering gear (e.g., electric power steering) 71, speaker 72, display 73, brake gear (e.g., brake) 74, driving gear (e.g., accelerator) 75 and lamps 76. The vehicle control units 7 control the behaviors of the controlled object in accordance with the running conditions of the vehicle. In addition, by controlling the behaviors of the controlled objects according to the instructions from a detection ECU 300, the vehicle control units 7 perform known vehicle controls, such as collision avoidance, speed warning, lane departure prevention, rear-end collision warning, inter-vehicle warning, lane departure warning, auto high beam, sign indication, full speed range adaptive cruise control (ACC), lane keeping, lane change accident prevention, blind spot warning, blind spot monitoring, automatic lane change, forward cross traffic warning, rearward cross traffic warning, erroneous pedal usage prevention, and automatic parking.

<Vehicle Control System>

The vehicle control system 1 includes an image sensor 100, a radar sensor 200 and the detection ECU 300.

The image sensor 100 picks up an image in the forward direction of the vehicle to repeatedly acquire image data, and processes the acquired image data to detect an object that is present in a predetermined imaging range. The image sensor 100 generates object information including at least the position, width and height of an object and outputs the generated object information to the detection ECU 300 together with image data to be displayed.

The radar sensor 200 is a well-known sensor that transmits and receives radar waves of a millimeter-wave band or of laser beams to detect an object that is present in a predetermined exploration range and has reflected the radar waves. The radar sensor 200 generates object information at least including a distance to the object from the vehicle, speed of the object relative to the vehicle, and lateral location of the object with respect to the vehicle and outputs the generated object information to the detection ECU 300.

In generating information regarding a detected object, the image sensor 100 and the radar sensor 200 also make use of the information obtained from the in-vehicle sensors 5. The objects detected by the image sensor 100 and the radar sensor 200 include, for example, an obstacle, preceding vehicles, preceding pedestrians, preceding objects, stationary vehicles, stationary pedestrians, stationary objects, on-coming vehicles, on-coming pedestrians, on-coming objects, lanes, road surface conditions, road shapes, light sources, road signs, traffic signals, entities that cut off the field of view of the sensor section 110, and environmental features outside the vehicle. However, the sensors 100 and 200 do not necessarily have to detect all of these objects but may detect at least those objects which are required for a vehicle control process (discussed later) which is performed by the detection ECU 300.

The detection ECU 300 is mainly configured by a well-know microcomputer that includes at least a CPU 310, RAM 320 and ROM 330. The ROM 330 stores a control program for performing the vehicle control process which realizes the various vehicle controls mentioned above using the vehicle control units 7 on the basis of the information on a detected object, which is outputted from the image sensor 100 and the radar sensor 200. The detection ECU 300 outputs instructions to the vehicle control units 7. In particular, the detection ECU 300 outputs to the display 73 the image data generated by the image sensor 100, or data obtained by processing the image data so as to be suitable for information display.

It should be noted that, in the vehicle control process, all the vehicle controls mentioned above do not have to be necessarily realized but at least one of the vehicle controls may be ensured to be performed. The vehicle controls may be ensured to be properly performed in accordance with the instructions from an external unit or the information acquired from the in-vehicle sensors 5.

<Image Sensor>

The image sensor 100 includes a sensor section 110 and a signal processing section 120. The sensor section 110 converts incident light to electrical signals and outputs the converted signals. The signal processing section 120 carries out an image data generation process for generating image data from the outputs of the sensor section 110, and an object detection process for detecting various objects based on the image data that has been generated through the image data generation process and outputting the detection results to the detection ECU 300. The image sensor 100 is periodically activated to pick up images of the scenes outside the vehicle.

The sensor section 110 configures a monocular camera. FIG. 11 is a schematic diagram illustrating the sensor section 110. As shown in FIG. 11, the sensor section 110 includes a lens system 13, an infrared cut filter 14, an optical lowpass filter 15 and an image sensor assembly 16.

The lens system 13 is configured by a plurality of lenses that cause the incident light to form an image on a surface of the image sensor assembly 16. Specifically, the lens system 13 is configured by four lenses which are, from a light-incident side (the left side in the figure), a plano-convex lens 13a, a double concave lens 13b, a plano-convex lens 13c and a concave meniscus lens 13d. With these four lenses, the lens system 13 is ensured to have a structure that prevents aberrations, such as chromatic aberration and comatic aberration.

The infrared cut filter 14 is arranged downstream of the lens system 13 to cut off near-infrared rays included in the incident light. The optical lowpass filter 15 is arranged downstream of the infrared cut filter 14 and configured to split the incident light that has passed through the lens system 13 and the infrared cut filter 14 into four incident light rays, by using the polarization characteristics. The four incident light rays are each ensured to be inputted to any of four pixels that configure a basic unit of the image sensor assembly 16. In the image sensor assembly 16 of FIG. 11, only four pixels configuring the basic unit are shown being enlarged, for the sake of clarity of view and for easy understanding of the operation of the optical lowpass filter 15.

The lens system 13, the infrared cut filter 14 and the optical lowpass filter 15 are well known as disclosed, for example, in JP-A-2011-233763. Therefore, the explanation on the details is omitted.

The image sensor assembly 16 is configured by an array type image sensor and an RGBC Bayer. The array type image sensor is a well-known sensor in which light-receiving elements, such as CMOS sensors and CCD sensors, are arrayed to acquire an optical image. The RGBC Bayer is a collection of a plurality of types of optical filters whose pass bands are different from each other. Each light-receiving element is configured to receive incident light via any one of the optical filters configuring the RGBC Bayer. Each light-receiving element has a light-receiving band which is sensitive at least to a wavelength corresponding to visible light.

Figure 12A:
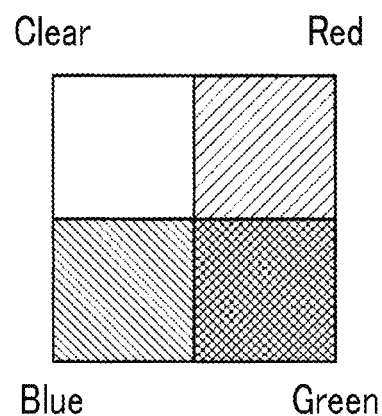
FIGS. 12A and 12B are diagrams illustrating a unit pattern and a general pattern, respectively, each showing an arrangement of filters that configure an RGBC Bayer.
Figure 12B:
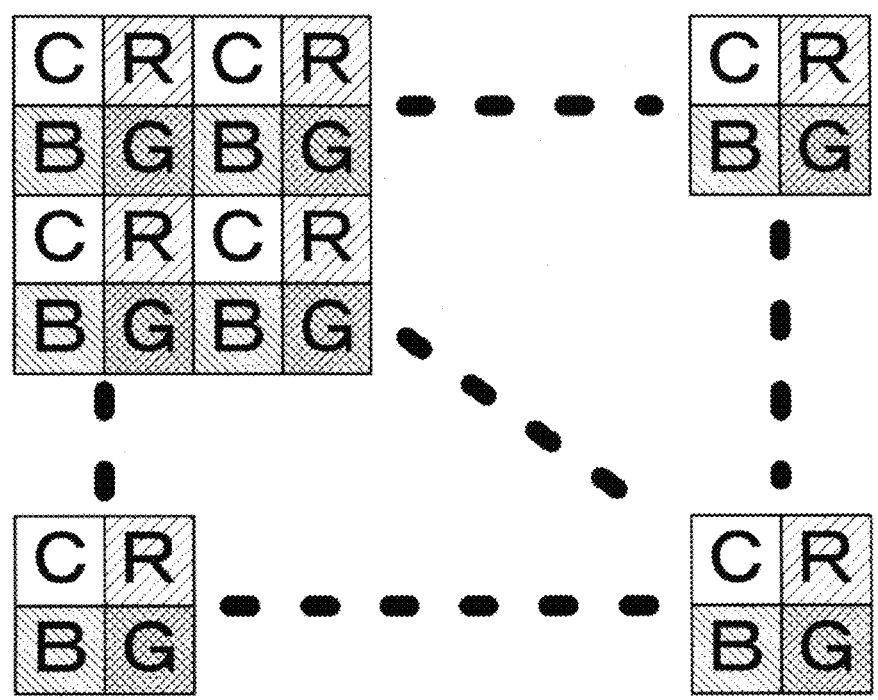

The RGBC Bayer includes optical filters which are correlated to the respective light-receiving elements and arranged in a pattern. The RGBC Bayer here is formed of four types of optical filters which are R (red) filters, G (green) filters, B (blue) filters and C (clear) filters. FIG. 12A is a diagram illustrating a unit pattern that corresponds to the four pixels. FIG. 12B is a diagram illustrating a general pattern in which a collection of the unit patterns is arranged entirely covering the array type image sensor. In the following description, the four types of optical filters configuring the RGBC Bayer are referred to R filters, G filters, B filters and C filters.

Figure 13:
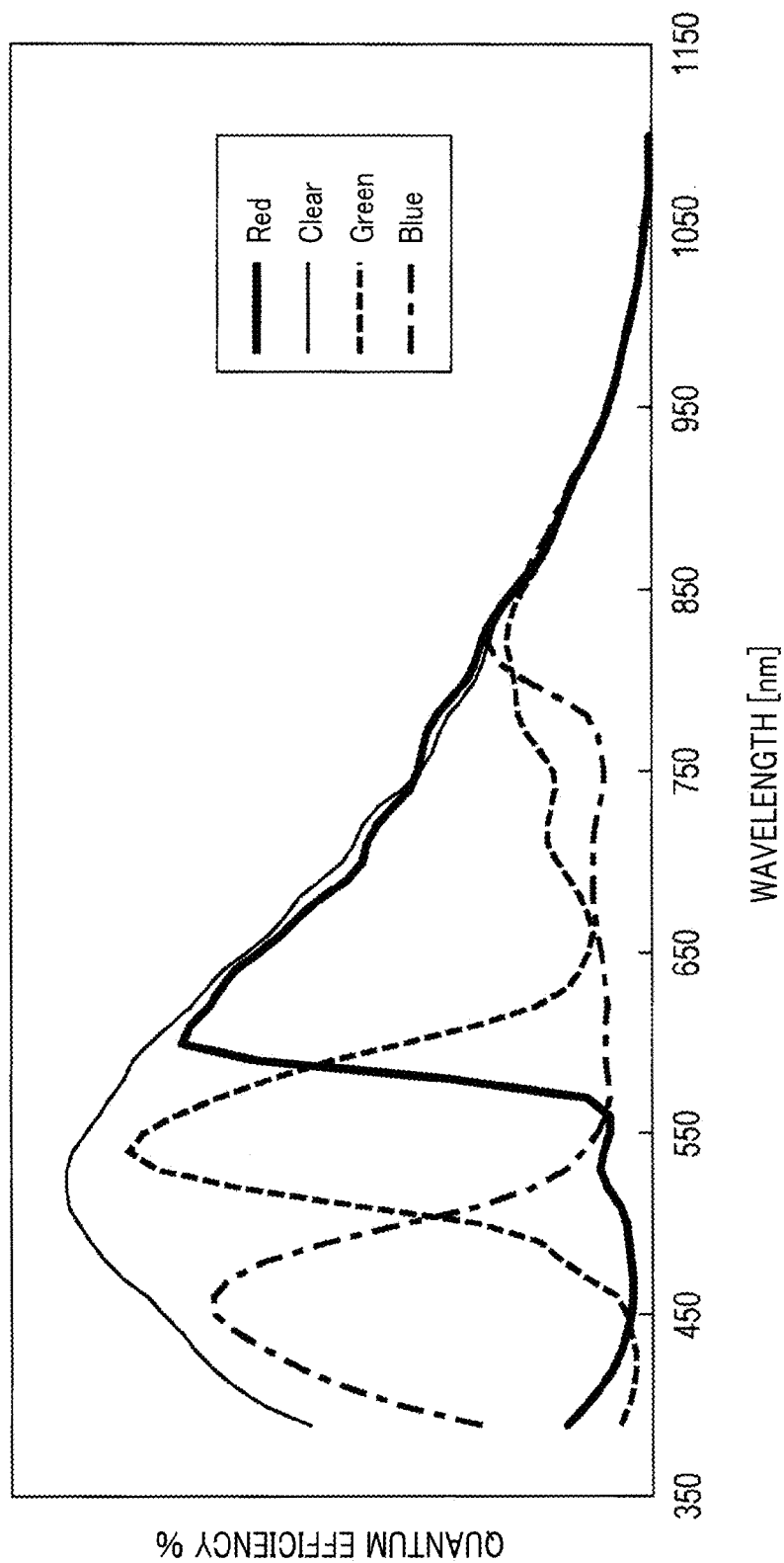
FIG. 13 is a graph showing transmission characteristics of the filters that configure the RGBC Bayer.

FIG. 13 is a graph showing transmission characteristics of the filters of the RGBC Bayer. As shown in FIG. 13, the R, G and B filters (hereinafter also referred to collectively as "color filters") have pass bands which are set so as to pass light with wavelengths corresponding to specified colors (red, green and blue). The pass band of the C filters is set so as to entirely include the pass bands of the three types of color filters and to have a quantum efficiency equal to or more than those of the color filters in each wavelength. In other words, the color filters correspond to the limited filters and the C filters correspond to the all-pass filters.

Further, the sensor section 110 includes an amplifier and an A/D converter, both not shown. The amplifier amplifies with a predetermined gain the outputs that are read out from the light-receiving elements configuring the image sensor assembly 16 (the outputs being analog signals indicating the brightness of the respective pixels), and the A/D converter converts the amplified analog values to digital values (pixel values) and outputs the converted values to the signal processing section 120. The output of the sensor section 110 is hereinafter referred to as "Bayer image data" (corresponding to the general image data), and the image expressed by the Bayer image data is referred to as "Bayer image".

<Signal Processing Section>

The signal processing section 120 is mainly configured by a well-known microcomputer at least including CPU, RAM and ROM. The ROM stores a control program for performing an image data generation process and an object detection process described later.

Figure 14:
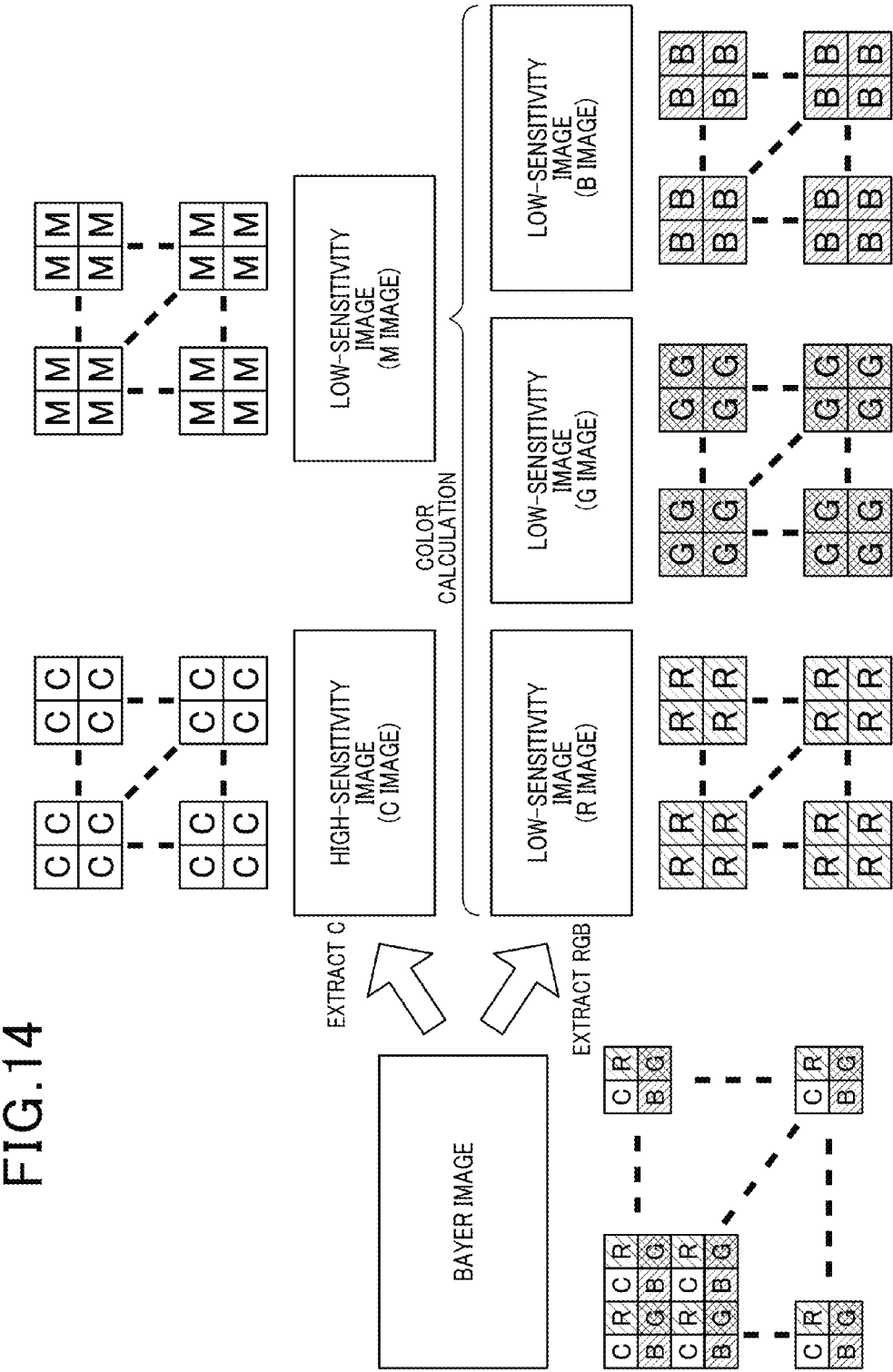
FIG. 14 is a diagram illustrating an image data generation process performed by a signal processing section.

FIG. 14 is a diagram illustrating the image data generation process performed by the signal processing section 120. As shown in FIG. 14, in the image data generation process, upon acquisition of the Bayer image data corresponding to one frame from the sensor section 110, the signal processing section 120 extracts the outputs of the light-receiving elements correlated to the C filters to generate high-sensitivity image data that represents a C image. At the same time, the signal processing section 120 extracts, for each type of color filters, the outputs of the light-receiving elements correlated to each type of the color filters, thereby generating three different low-sensitivity image data that represent an R image, a G image and a B image, respectively. The four different image data obtained in this way are hereinafter referred to as discrete image data.

The filters configuring the RGBC Bayer are uniformly arranged over the entire Bayer image. Accordingly, the discrete image data generated for the individual types of filters are under conditions in which the angles of view and the resolutions are substantially the same.

In the image data generation process, the signal processing section 120 may perform color calculation (summing at a predetermined ratio) on the basis of the three pieces of different low-sensitivity image data to generate one or more different M images (low-sensitivity images of black and white or of arbitrary colors) and the generated M images may be added to the discrete image data.

Figure 15:
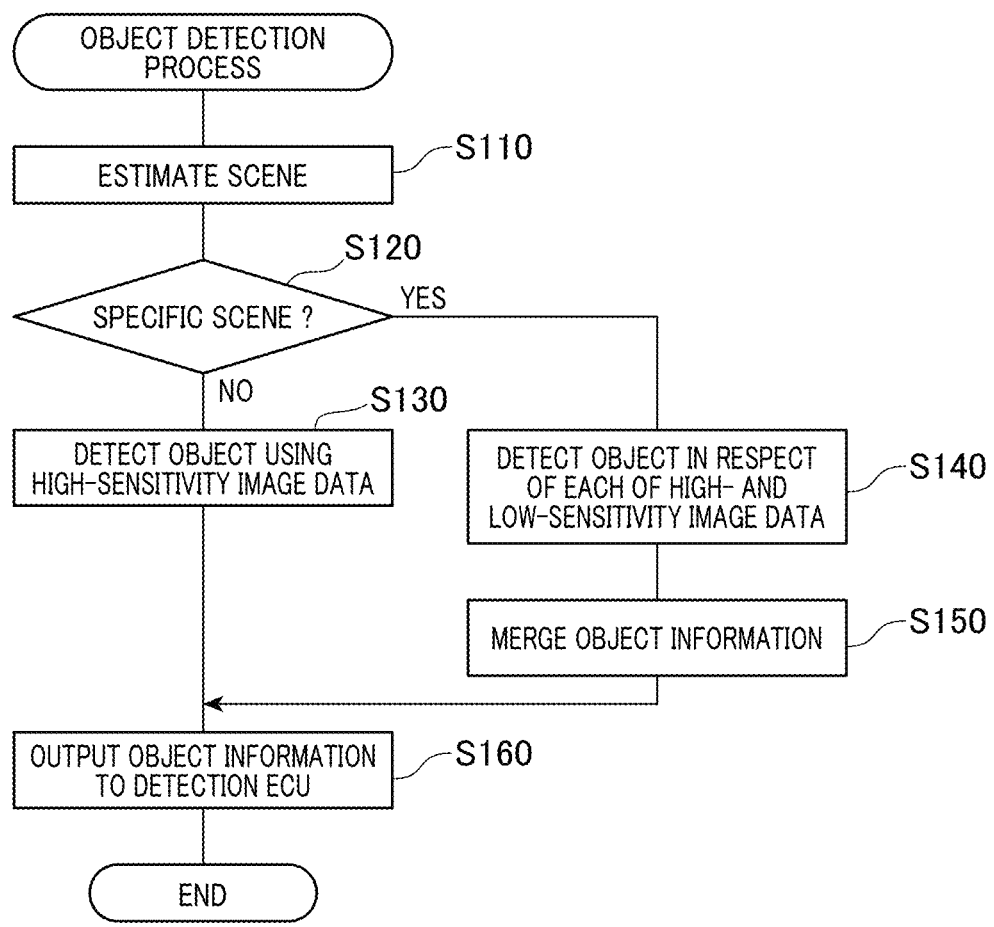
FIG. 15 is a flow diagram illustrating an object detection process performed by the signal processing section.

Referring to FIG. 15, the object detection process is described. FIG. 15 is a flow diagram illustrating the object detection process performed by the signal processing section 120. The object detection process is started every time the discrete image data corresponding to one frame are generated through the image data generation process.

In the present process, the signal processing section 120 estimates as to what scene is represented by the image (Bayer image) of the Bayer image data that has been acquired by the sensor section 110 (step S110). Then, the signal processing section 120 determines whether or not the estimated scene is a specific scene having a probability of including overexposure areas or underexposure areas due to an insufficient dynamic range (step S120).

Specifically, the signal processing section 120 determines whether or not the estimated scene is a specific scene on the basis of the probability that the image has areas where the brightness is extremely different from other areas in the image. For example, such a specific scene may be a scene that includes an image of a construction (building) that casts a shadow equal to or larger than an object, such as a scene near the entrance/exit of a tunnel, a scene under an elevating structure, or a scene by the side of a building. Such a specific scene can be determined, for example, from the map data (prepared map information) near the present location which is acquired from the navigation apparatus, or the detection results in the past of the object detection process. Alternatively, the determination on the specific scene may be made by making a comparison in the brightness between various portions in the image, on the basis of the Bayer image data or the discrete image data.

If it is determined that the estimated scene is not a specific scene (NO in step S120), the signal processing section 120 performs a process of detecting an object taken in the image on the basis of the high-sensitivity image data (C image data) and generates object information related to the detected object (step S130).

If it is determined that the estimated scene is a specific scene (YES in step S120), the signal processing section 120 selects the high-sensitivity image data and at least one piece of low-sensitivity image data, performs, for each of the selected image data, a process of detecting an object taken in the image, and generates object information related to the detected object (step S140). Further, the signal processing section 120 merges the object information generated in step S140 for the individual image data (step S150). In this case, the objects detected at an identical position in both image data are regarded as being an identical object and combined into one. In other words, since the image data are acquired simultaneously, the objects detected at the same position can be immediately determined to be an identical object without performing another processing, such as tracking.

Then, the signal processing section 120 outputs, to the detection ECU 300, the object information generated in step S130 or S150 together with predetermined image data to be displayed (e.g., the high-sensitivity image data or the image data used for detecting an object) (step S160). Then, the present process is terminated. It should be noted that, in step S160, the object information alone may be outputted to the detection ECU 300.

<Advantageous Effects>

As described above, the vehicle control system 1 generates a plurality of discrete image data having different degrees of brightness (sensitivity) from a piece of Bayer image data. Further, for a specific scene having a high contrast and an insufficient dynamic range, an object is detected using the plurality of discrete image data having different degrees of brightness. Accordingly, for example, in the event that there are areas in any of the high- or low-sensitivity image data, in which an overexposure or an underexposure is caused, an object that is present in the areas is detected on the basis of other image data which are not in such conditions. Thus, objects that are present in the imaging range can be detected without any omission. Specifically, the vehicle control system 1 is able to detect, without any omission, an object which is located in a spot where the object is difficult to detect due to the shadow of a large construction. Such an object includes, for example, a vehicle near the entrance/exit of a tunnel, a pedestrian by the side of a building, a vehicle under an elevating structure, or a vehicle by the side of a bridge rail.

The plurality of discrete image data are generated from a piece of Bayer image data acquired at the same instant. Accordingly, no positional offset of an object is caused between the discrete image data. Thus, the objects that are present at the same position are immediately determined to be an identical object. As a result, an erroneous detection of an object is prevented, i.e. the accuracy of detecting an object is improved, without the necessity of performing a special processing, such as tracking.

[Third Embodiment]

Figure 16:
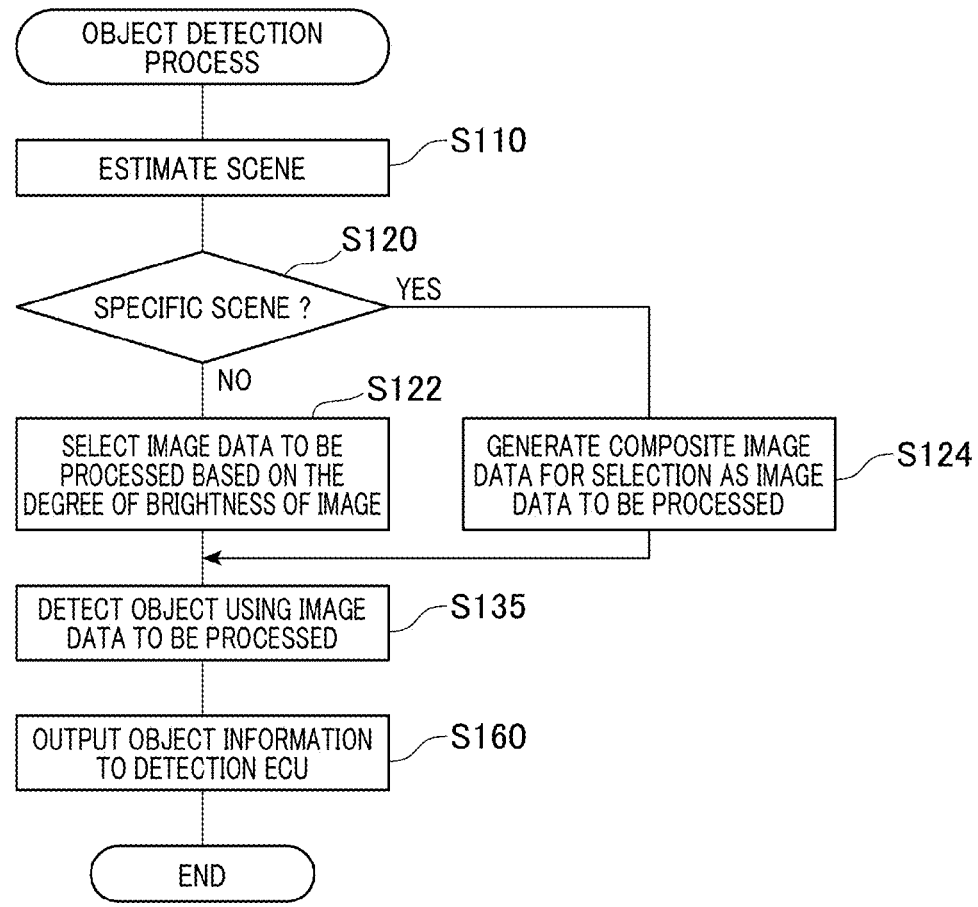
FIG. 16 is a flow diagram illustrating an object detection process, according to a third embodiment.

Referring now to FIG. 16, a third embodiment is described. The third embodiment has a basic configuration similar to that of the second embodiment, with an only difference from the second embodiment being the object detection process performed by the signal processing section 120. Therefore, the following description is focused on the difference, omitting the explanation on the common configuration. Further, in the second and the subsequent embodiments, the components identical with or similar to those in the second embodiment are given the same reference numerals for the sake of omitting unnecessary explanation.

<Object Detection Process>

FIG. 16 is a flow diagram illustrating an object detection process according to the third embodiment. Upon start of the present process, the signal processing section 120 performs scene estimation (step S110) and determines whether or not the estimated scene is a specific scene (step S120).

If it is determined that the estimated scene is not a specific scene (NO in step S120), the signal processing section 120 selects image data to be processed (step S122). Specifically, the signal processing section 120 selects the high-sensitivity image data (C image data) as image data to be processed, if an average brightness of the image based on the C image data is equal to or lower than a predetermined threshold, but selects low-sensitivity image data (any of the R, G, B and M image data) as image data to be processed, if the average brightness is higher than the threshold.

If it is determined that the estimated scene is a specific scene (YES in step S120), the signal processing section 120 generates composite image data by combining the high-sensitivity image data with low-sensitivity image data, and selects the composite image data as image data to be processed (step S124).

In generating the composite image data, the low-sensitivity image data is applied to portions which, if any, are extremely brighter than other portions (areas having a probability of suffering from overexposure) and the high-sensitivity image data is applied to other portions. In contrast, in generating the composite image data, the high-sensitivity image data is applied to portions which, if any, are extremely darker than other portions (areas having a probability of suffering from underexposure) and the low-sensitivity image data is applied to other portions.

Then, the signal processing section 120 performs a process for detecting an object present in the image on the basis of the image data to be processed selected in step S122 or S124 and generates object information related to the detected object (step S135).

Then, the signal processing section 120 outputs the object information generated in step S135 together with predetermined image data to be displayed to the detection ECU 300 (step S160). Then, the present process is terminated.

<Advantageous Effects>

In the present embodiment, when the estimated scene is a specific scene, a piece of composite image data is generated from the plurality of discrete image data generated through the image data generation process, and an object is detected using the composite image data. In this way, since only one image data is to be processed in the object detection process, the processing load in the object detection process is mitigated.

[Fourth Embodiment]

A fourth embodiment is described. The fourth embodiment has a basic configuration similar to that of the second embodiment, with an only difference from the second embodiment being the object detection process and a part of the processes performed by the detection ECU 300. Therefore, the following description is focused on the difference, omitting the explanation on the common configuration.

<Detection ECU>

In addition to the processes for realizing the various controls over the vehicle described in the second embodiment, the detection ECU 300 performs the following process. In the process, the detection ECU 300 (external unit) outputs, to the image sensor 100, an image data designation instruction that designates image data to be processed which is suitable for detecting an object and necessary for the effectively operating vehicle controls, on the basis of the conditions of the vehicle controls and the conditions surrounding the vehicle (weather, time of day, etc.) obtained from the in-vehicle sensors 5.

<Signal Processing Section>

The signal processing section 120 stores the image data designation instruction from the detection ECU 300 in a predetermined storage area of the RAM.

Then, the object detection process described referring to FIG. 15 or 16 is performed.

However, when the process shown in FIG. 15 is performed, the signal processing section 120 detects an object, in step S130, using discrete image data or composite image data, which is designated by the image data designation instruction that has been stored in the storage area.

When the process shown in FIG. 16 is performed, the signal processing section 120 selects, in step S122, discrete image data or composite image data as image data to be processed which is designated by the image data designation instruction that has been stored in the storage area.

<Advantageous Effects>

According to the present embodiment, an object is detected using discrete image data or composite image data, which is suitable for the vehicle controls currently performed. Thus, the accuracy of detecting an object is further improved.

Specifically, for example, when vehicle controls required for detecting a forward vehicle as an object are underway at nighttime, the detection ECU 300 can output an image data designation instruction for using low-sensitivity image data for the detection of the object because the tail lights of the forward vehicle are extremely bright. Also, when vehicle controls required for detecting a pedestrian as an object are underway at nighttime, the detection ECU 300 can output an image data designation instruction for using high-sensitivity image data for the detection of the object because pedestrians appear dark.

[Other Embodiments]

It will be appreciated that the present invention is not limited to the configurations described above, but any and all modifications, variations or equivalents, which may occur to those who are skilled in the art, should be considered to fall within the scope of the present invention.

(1) In the foregoing embodiments, there is no definition on the relationship between the imaging range of the image sensor 100 and the exploration range of the radar sensor 20. The imaging range and the exploration range may be determined so as to be overlapped with each other, or may be determined so as to be different from each other. In the case of the former in particular, the data obtained by different types of sensors are comprehensively dealt with. Such sensor fusion can realize higher recognition functions and further improve the accuracy in the detection of an object.

Figure 17:
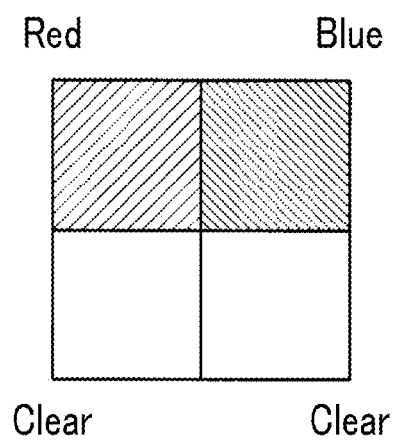
FIG. 17 is a diagram illustrating another configuration example of a basic pattern of Bayer (basic Bayer filter).

(2) As shown in FIG. 12A, different filters are arranged in the four respective pixels of the unit pattern of the RGBC Bayer. Alternatively, different filters may be arranged in the unit pattern on a row-specific basis in the direction of reading the output of the light-receiving elements. For example, as shown in FIG. 17, when the direction of reading the output of the light-receiving elements is the left-and-right direction in the figure, a combination of the R and G filters may be arranged in the upper half, and the C filters alone may be arranged in the lower half. In this case, under the condition that high-resolution image data (C image data) alone is required, only the data in the rows of the light-receiving elements arranged being correlated to the C filters may be read from the sensor section, thereby contributing to reducing the amount of processing. The arrangement of the filters is not limited to the one in the example shown in FIG. 17. For example, monochromatic filters may be alternately arranged in the unit pattern on a row-specific basis. For example, a row of the R filters may be alternated with a row of the C and R filters.

(3) In the foregoing embodiments, the sensor section 110 is configured so that the light-receiving elements can receive the incident light via the RGBC Bayer. Accordingly, a plurality of discrete image data having different degrees of brightness are ensured to be generated from the Bayer image data outputted from the sensor section 110. Similar to this, the radar sensor 20 may also be configured by a receiver section that includes a plurality of types of filters having different pass bands, and a plurality of receiving elements for receiving electromagnetic waves via the respective filters. Thus, based on a general scan data set corresponding to the output of the receiver section, the outputs from the receiving elements correlated to the same type of filters can be extracted. Thus, discrete scan data sets that are the scan data sets of the individual types of the filters may be generated. Then, an object may be ensured to be detected on the basis of the discrete scan data sets or a composite scan data set obtained by combining the discrete scan data sets.

(4) In the foregoing embodiments, the object detection process is performed by the signal processing section 120 of the image sensor 100. Alternatively, the object detection process may be performed by the detection ECU 300. Further, the signal processing section 120 may be omitted from the image sensor 100, and the processes performed by the signal processing section 120 may all be performed by the detection ECU 300.

(5) In the foregoing embodiments, a scene is estimated and, depending on whether the scene is a specific scene, discrete image data used for the detection of an object is ensured to be selected, or composite image data for the detection is ensured to be generated. Alternatively, composite image data may be ensured to be generated from the discrete image data without estimating or judging a scene. For example, in an image, a vehicle in a far distance tends to appear brightly reflecting the sun, for example. Accordingly, composite image data may be generated using low-sensitivity image data for a far distance area, and high-sensitivity image data for a short distance area.

(6) In the foregoing embodiments, any of the discrete image data is used as it is in each area of an image when generating composite image data. Alternatively, image data with a pixel value of an increased bit size and with an adjusted pixel value may be generated as composite image data, so that the dynamic range of the high-sensitivity image data and that of the low-sensitivity image data can both be expressed by single image data.

(7) In the foregoing embodiments, high-sensitivity image data is used when the estimated scene is not a specific scene, while high- and low- sensitivity image data are used singly or in combination when the estimated scene is a specific scene. Alternatively, high-sensitivity image data may be used when the estimated scene is a specific scene, while low-sensitivity image data may be used when the estimated scene is not a specific scene.

(8) In the foregoing embodiments, the high- and low-sensitivity image data are used singly or in combination. However, the high- and low-sensitivity image data may be used through comparison. For example, dark tail lamps in a far distance may have a small pixel value and thus may be drowned out by noise. To cope with this, low-sensitivity image data may be compared with high-sensitivity image data corresponding to the low-sensitivity image data to determine whether or not the candidates of the light sources are noise. In other words, the R image may be checked using the C image. Specifically, if the C pixel value is not larger than the R pixel value by a predetermined factor or more, the candidates of the light sources may be determined to be noise. Thus, a method of using image data can be suitably applied to a system such as for auto high beam, which is based on light source recognition such as of the tail lamps of a preceding vehicle or the head lights of an on-coming vehicle. Thus, the accuracy of recognizing light sources can be improved.

(9) In the foregoing embodiments, the scene determined to be a specific scene is specifically exemplified to be a scene in which a construction casts a shadow with a size equal to or larger than an object, such as a shadow near the exit/entrance of a tunnel, a shadow under an elevating structure or a shadow by the side of a building. However, a daytime scene or a nighttime scene may be determined to be another example of a specific scene. For example, in determining a daytime scene or a nighttime scene, a luminance sensor may be used. If the luminance is lower than a predetermined threshold, the scene may be determined to be a nighttime scene. On the other hand, in a bright daytime scene, low-sensitivity image data may be used to lower the sensitivity. Thus, a target having a periodicity (e.g., vehicle light, LED electronic sign, or traffic light) can be imaged with a longer exposure time, thereby preventing flickering. Further, since a dark nighttime scene contrarily has a high probability of being drowned by noise due to the lowering of sensitivity, high-sensitivity image data may be used. Thus, a method of using image data can be suitably applied to a system such as for speed warning or sign display based on sign recognition. Thus, the accuracy of recognizing signs can be improved.

However, in a dark nighttime scene, if a sign is illuminated with a high beam, the picked-up image may be saturated, disabling recognition of the sign. In this case, whether an image is saturated may be used as a basis for determining a specific scene. If the image is saturated, low-sensitivity image data may be used.

In a bright daytime scene, an image may become extremely dark due to backlight or the like. In this case, whether an image is extremely dark may be used as a basis for determining a specific scene. If an image is extremely dark, high-sensitivity image data may be used to raise the sensitivity.

(10) The components of the present invention are conceptual and should not be construed as being limited to the components of the foregoing embodiments. For example, the function possessed by a single component may be split into a plurality of components, or the functions possessed by a plurality of components may be combined into a single component. Further, at least a part of the configuration in each of the foregoing embodiments may be replaced by a known configuration having the same function. In addition, at least a part of the configuration in each of the foregoing embodiments may be added to or replaced by a different one of the foregoing embodiments.

Hereinafter, aspects of the above-described embodiments will be summarized.

As an aspect of the embodiment, a vehicle control system includes a light-receiving section, an image data generation section, an image data processing section, and a vehicle control section.

The light-receiving section has a plurality of filters having different pass bands, and a plurality of light-receiving elements, each of which receives incident light via any one of the filters. The image data generation section extracts, when receiving general image data which is an output of the light-receiving section, outputs of the light-receiving elements correlated to the filters to generate discrete image data, which is image data for each of the filters. The image data processing section detects, based on the discrete image data generated by the image data generation section or composite image data generated by combining the discrete image data, at least one object included in a group of an obstacle, a preceding vehicle, a preceding pedestrian, a preceding object, a stationary vehicle, a stationary pedestrian, a stationary object, an on-coming vehicle, an on-coming pedestrian, an on-coming object, a lane, a road surface condition, a road shape, a light source, a road sign, a traffic signal, an entity which cuts off a field of view of the light-receiving section, and an environmental feature outside a vehicle.

The entities that cut off the field of view include, for example, stains attached to glass or lenses, cloudy weather, and shielding. The environmental features outside the vehicle include, for example, rain, snow, fog, the sky, clouds, the sun and the moon.

The vehicle control section performs, according to the object detected by the image data processing section, vehicle control regarding at least one of collision avoidance, speed warning, lane departure prevention, rear-end collision warning, inter-vehicle warning, lane departure warning, auto high beam, sign indication, full speed range adaptive cruise control, lane keeping, lane change accident prevention, blind spot warning, blind spot monitoring, automatic lane change, forward cross traffic warning, rearward cross traffic warning, erroneous pedal usage prevention, and automatic parking.

The filters correlated to the receiving elements that are the sources of generating respective discrete image data (image patterns) have different pass bands. Therefore, although the discrete image data are acquired at the same timing, the degrees of brightness of the images expressed by the discrete image data are different from each other.

The vehicle control system of the present embodiment configured in this way enables simultaneous pickup of a plurality of image data having different degrees of brightness. Accordingly, in a picked-up scene having a high contrast with an insufficient dynamic range, image data having a brightness suitable for detecting an object can be properly selected to thereby detect the objects that are present in the imaging range without omission.

Since the plurality of image data are acquired at the same timing, positional offset of an object is not caused between a plurality of images. Accordingly, the objects that are present at the same position are immediately determined to be an identical object. Thus, erroneous detection of an object is prevented and the accuracy of detecting an object is improved.

Other than the vehicle control system described above, the present embodiment can be implemented in various modes, such as: a vehicle control system that includes a receiver section, instead of the light-receiving section, for receiving electromagnetic waves; a vehicle control system that detects an object using both of the outputs of a light-receiving section and a receiver section; and an image sensor that includes a light-receiving section and an image data generation section.

Note that the above embodiments may be implemented in combination with each other.

What is claimed is:

1. A recognition object detecting apparatus disposed in an own vehicle, the apparatus comprising:
means for generating image data representing a taken image; and
means for detecting a recognition object from the image represented by the image data, wherein
the generating means has a characteristic in which a relation between luminance and output pixel values varies depending on a luminance range and on a distance between the own vehicle and the recognition object, wherein a first distance between the own vehicle and the recognition object is associated with a first luminance range, a second distance between the own vehicle and the recognition object is less than the first distance and is associated with a second luminance range greater than the first luminance range, further wherein, in the generating means, the relation between the luminance and the output pixel values for the first luminance range is represented by a first line and the relation between the luminance and the output pixel values for the second luminance range is represented by a second line, wherein the first line is steeper than the second line, and
the detecting means binarizes the output pixel values of the image represented by the image data by using a plurality of threshold values to generate a plurality of binary images, and detects the recognition object based on the plurality of binary images.

2. The recognition object detecting apparatus according to claim 1, further comprising:
means for measuring a temperature of the generating means; and
means for correcting an imaging condition of the generating means depending on the temperature measured by the measuring means.

3. The recognition object detecting apparatus according to claim 2, wherein
the correcting means corrects the relation between luminance and output pixel values.

4. The recognition object detecting apparatus according to claim 1, further comprising:
means for measuring a temperature of the generating means; and
means for correcting the plurality of threshold values depending on the temperature measured by the measuring means.

5. The recognition object detecting apparatus according to claim 1, wherein
the detecting means detects the recognition object based on a shape of a group of pixels including a plurality of pixels having high luminance in the binary image.

6. The recognition object detecting apparatus according to claim 1, wherein
the generating means takes an image of a scene ahead of the own vehicle, and
the detecting means detects tail lights of a leading vehicle or headlights of an oncoming vehicle as the recognition object.

7. A recognition object detecting apparatus disposed in an own vehicle, the apparatus comprising:
means for generating image data representing a taken image; and
means for detecting a recognition object from the image represented by the image data, wherein
the generating means has a characteristic in which a relation between luminance and output pixel values varies depending on a luminance range and a distance between the own vehicle and the recognition object,
the detecting means binarizes the output pixel values of the image represented by the image data by using a plurality of threshold values to generate a plurality of binary images, and detects the recognition object based on the plurality of binary images, and
in the generating means, a range of the output pixel values in a first luminance range per unit luminance width is larger than a range of the output pixel values in a second luminance range per the unit luminance width, the luminance of the second luminance range being larger than the luminance of the first luminance range.

8. The recognition object detecting apparatus according to claim 7, further comprising:
means for measuring a temperature of the generating means; and
means for correcting an imaging condition of the generating means depending on the temperature measured by the measuring means.

9. The recognition object detecting apparatus according to claim 8, wherein
the correcting means corrects the relation between luminance and output pixel values.

10. The recognition object detecting apparatus according to claim 7, further comprising:
means for measuring a temperature of the generating means; and
means for correcting the plurality of threshold values depending on the temperature measured by the measuring means.

11. The recognition object detecting apparatus according to claim 7, wherein
the detecting means detects the recognition object based on a shape of a group of pixels including a plurality of pixels having high luminance in the binary image.

12. The recognition object detecting apparatus according to claim 7, wherein
the generating means takes an image of a scene ahead of the own vehicle, and
the detecting means detects tail lights of a leading vehicle or headlights of an oncoming vehicle as the recognition object.

13. A recognition object detecting apparatus disposed in an own vehicle, the apparatus comprising:
means for generating image data representing a taken image; and
means for detecting a recognition object from the image represented by the image data, wherein
the generating means has a characteristic in which a relation between luminance and output pixel values varies depending on a luminance range and a distance between the own vehicle and the recognition object,
the detecting means binarizes the output pixel values of the image represented by the image data by using a plurality of threshold values to generate a plurality of binary images, and detects the recognition object based on the plurality of binary images, and in the generating means, the relation between luminance and output pixel values is represented by a relation between a plurality of straight lines having different inclinations.

14. The recognition object detecting apparatus according to claim 13, further comprising:
    means for measuring a temperature of the generating means; and
    means for correcting an imaging condition of the generating means depending on the temperature measured by the measuring means.

15. The recognition object detecting apparatus according to claim 14, wherein
    the correcting means corrects the relation between luminance and output pixel values.

16. The recognition object detecting apparatus according to claim 13, further comprising:
    means for measuring a temperature of the generating means; and
    means for correcting the plurality of threshold values depending on the temperature measured by the measuring means.

17. The recognition object detecting apparatus according to claim 13, wherein
    the detecting means detects the recognition object based on a shape of a group of pixels including a plurality of pixels having high luminance in the binary image.

18. The recognition object detecting apparatus according to claim 13, wherein
    the generating means takes an image of a scene ahead of the own vehicle, and
    the detecting means detects tail lights of a leading vehicle or headlights of an oncoming vehicle as the recognition object.

19. A recognition object detecting apparatus disposed in an own vehicle, the apparatus comprising:
    means for generating image data representing a taken image; and
    means for detecting a recognition object from the image represented by the image data, wherein
    the generating means has a characteristic in which a relation between luminance and output pixel values varies depending on a luminance range and a distance between the own vehicle and the recognition object,
    the detecting means binarizes the output pixel values of the image represented by the image data by using a plurality of threshold values to generate a plurality of binary images, and detects the recognition object based on the plurality of binary images, and
    the recognition object detecting apparatus further comprises:
    means for detecting, based on the image data, at least one object included in a group of an obstacle, a preceding vehicle, a preceding pedestrian, a preceding object, a stationary vehicle, a stationary pedestrian, a stationary object, an on-coming vehicle, an on-coming pedestrian, an on-coming object, a lane, a road surface condition, a road shape, a light source, a road sign, a traffic signal, an entity which cuts off a field of view of a light-receiving section, and an environmental feature outside a vehicle; and
    means for performing, according to the object detected by the detecting means, vehicle control regarding at least one of collision avoidance, speed warning, lane departure prevention, rear-end collision warning, inter-vehicle warning, lane departure warning, auto high beam, sign indication, full speed range adaptive cruise control, lane keeping, lane change accident prevention, blind spot warning, blind spot monitoring, automatic lane change, forward cross traffic warning, rearward cross traffic warning, erroneous pedal usage prevention, and automatic parking.

20. The recognition object detecting apparatus according to claim 19, further comprising:
    means for measuring a temperature of the generating means; and
    means for correcting an imaging condition of the generating means depending on the temperature measured by the measuring means.

21. The recognition object detecting apparatus according to claim 20, wherein
    the correcting means corrects the relation between luminance and output pixel values.

22. The recognition object detecting apparatus according to claim 19, further comprising:
    means for measuring a temperature of the generating means; and
    means for correcting the plurality of threshold values depending on the temperature measured by the measuring means.

23. The recognition object detecting apparatus according to claim 19, wherein
    the detecting means detects the recognition object based on a shape of a group of pixels including a plurality of pixels having high luminance in the binary image.

24. The recognition object detecting apparatus according to claim 19, wherein
    the generating means takes an image of a scene ahead of the own vehicle, and
    the detecting means detects tail lights of a leading vehicle or headlights of an oncoming vehicle as the recognition object.

* * * * *